US012519492B2

(12) United States Patent
Ono et al.

(10) Patent No.: US 12,519,492 B2
(45) Date of Patent: Jan. 6, 2026

(54) HIGH-FREQUENCY MODULE AND COMMUNICATION DEVICE

(71) Applicant: Murata Manufacturing Co., Ltd., Kyoto (JP)

(72) Inventors: Mayuka Ono, Kyoto (JP); Motoji Tsuda, Kyoto (JP); Keisuke Arima, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 335 days.

(21) Appl. No.: 18/318,891

(22) Filed: May 17, 2023

(65) Prior Publication Data

US 2023/0308121 A1 Sep. 28, 2023

Related U.S. Application Data

(63) Continuation of application No. PCT/JP2021/044117, filed on Dec. 1, 2021.

(30) Foreign Application Priority Data

Dec. 4, 2020 (JP) .................................. 2020-202289

(51) Int. Cl.
*H04B 1/00* (2006.01)
*H04B 1/04* (2006.01)

(52) U.S. Cl.
CPC ............. *H04B 1/0078* (2013.01); *H04B 1/04* (2013.01); *H04B 2001/0408* (2013.01)

(58) Field of Classification Search
CPC ............ H04B 1/0078; H04B 1/04; H04B 2001/0408; H01L 23/36; H01L 25/04;

(Continued)

(56) References Cited

U.S. PATENT DOCUMENTS

2008/0166980 A1 7/2008 Fukamachi et al.
2017/0256474 A1 9/2017 Fujinaga
(Continued)

FOREIGN PATENT DOCUMENTS

JP 2007-295327 A 11/2007
JP 2009-021848 A 1/2009
(Continued)

OTHER PUBLICATIONS

International Search Report for PCT/JP2021/044117 dated Mar. 8, 2022.

*Primary Examiner* — Matthew D. Anderson
(74) *Attorney, Agent, or Firm* — McDonald Hopkins LLC

(57) ABSTRACT

Heat dissipation properties of a power amplifier is improved. A high-frequency module includes a mounting substrate, at least one power amplifier, an electronic component, a resin layer, a conductive member, and a plurality of via conductors. The power amplifier is mounted on a first main surface of the mounting substrate. The electronic component is mounted on a second main surface of the mounting substrate. The resin layer is disposed on the first main surface of the mounting substrate, and covers at least a part of the power amplifier. The conductive member covers at least a part of the resin layer, and covers at least a part of an outer peripheral surface of the mounting substrate. The plurality of via conductors is connected to the power amplifier, and passes through the mounting substrate. At least one via conductor of the plurality of via conductors is in contact with the conductive member.

19 Claims, 11 Drawing Sheets

(58) Field of Classification Search
CPC . H01L 25/18; H05K 1/02; H05K 3/46; H05K 9/00

See application file for complete search history.

(56) References Cited

U.S. PATENT DOCUMENTS

| | | |
|---|---|---|
| 2018/0166387 A1 | 6/2018 | Matsui et al. |
| 2020/0051941 A1 | 2/2020 | Nakazawa et al. |
| 2020/0251459 A1 | 8/2020 | Tsuda et al. |
| 2020/0395262 A1 | 12/2020 | Nomura et al. |
| 2023/0308121 A1* | 9/2023 | Ono .................. H01L 25/18 |

FOREIGN PATENT DOCUMENTS

| | | |
|---|---|---|
| JP | 2018-098677 A | 6/2018 |
| JP | 2020-027974 A | 2/2020 |
| JP | 2020-126921 A | 8/2020 |
| WO | 2016/080333 A1 | 5/2016 |
| WO | 2019/181761 A1 | 9/2019 |

* cited by examiner

HIGH-FREQUENCY MODULE AND COMMUNICATION DEVICE

CROSS REFERENCE TO RELATED APPLICATION

This is a continuation of International Application No. PCT/JP2021/044117 filed on Dec. 1, 2021 which claims priority from Japanese Patent Application No. 2020-202289 filed on Dec. 4, 2020. The contents of these applications are incorporated herein by reference in their entireties.

BACKGROUND OF THE DISCLOSURE

Field of the Disclosure

The present disclosure generally relates to a high-frequency module and a communication device, and more particularly, to a high-frequency module including a mounting substrate, and a communication device including a high-frequency module.

Description of the Related Art

Patent Document 1 describes a high-frequency module including a mounting substrate, a power amplifier, a via conductor, and a metal block (terminal).

The mounting substrate is a double-sided mounting substrate that has a first main surface and a second main surface opposite to each other, and in which a circuit component is mounted on each of the first main surface and the second main surface. The power amplifier is mounted on the first main surface of the mounting substrate. The metal block is disposed on the second main surface of the mounting substrate. The via conductor passes through the mounting substrate, an end face of the via conductor on a side of the first main surface is connected to the power amplifier with a bump electrode interposed therebetween, and an end face of the via conductor on a side of the second main surface is connected to the metal block.

Patent Document 1: Japanese Unexamined Patent Application Publication No. 2020-126921

BRIEF SUMMARY OF THE DISCLOSURE

In the high-frequency module described in Patent Document 1, the heat dissipation properties of the power amplifier are not sufficient in some cases.

It is a possible benefit of the present disclosure to provide a high-frequency module and a communication device with which the heat dissipation properties of a power amplifier can be improved.

A high-frequency module according to an aspect of the present disclosure includes a mounting substrate, at least one power amplifier, an electronic component, a resin layer, a conductive member, and a plurality of via conductors. The mounting substrate has a first main surface and a second main surface opposite to each other. The power amplifier is mounted on the first main surface of the mounting substrate. The electronic component is mounted on the second main surface of the mounting substrate. The resin layer is disposed on the first main surface of the mounting substrate, and covers at least a part of the power amplifier. The conductive member covers at least a part of the resin layer, and covers at least a part of an outer peripheral surface of the mounting substrate. The plurality of via conductors is connected to the power amplifier, and passes through the mounting substrate. At least one via conductor of the plurality of via conductors is in contact with the conductive member.

A communication device according to an aspect of the present disclosure includes the high-frequency module and a signal processing circuit. The signal processing circuit is connected to the high-frequency module.

According to a high-frequency module and a communication device of an aspect of the present disclosure, it is possible to improve the heat dissipation properties of a power amplifier.

DETAILED DESCRIPTION OF THE DISCLOSURE

Any one of FIG. 1, FIG. 2, and FIG. 5 to FIG. 11 referred to in the following embodiments and the like is a schematic diagram, and respective ratios of sizes and thicknesses of respective components in the figure do not necessarily reflect actual dimensional ratios.

Embodiment 1

Figure 1:
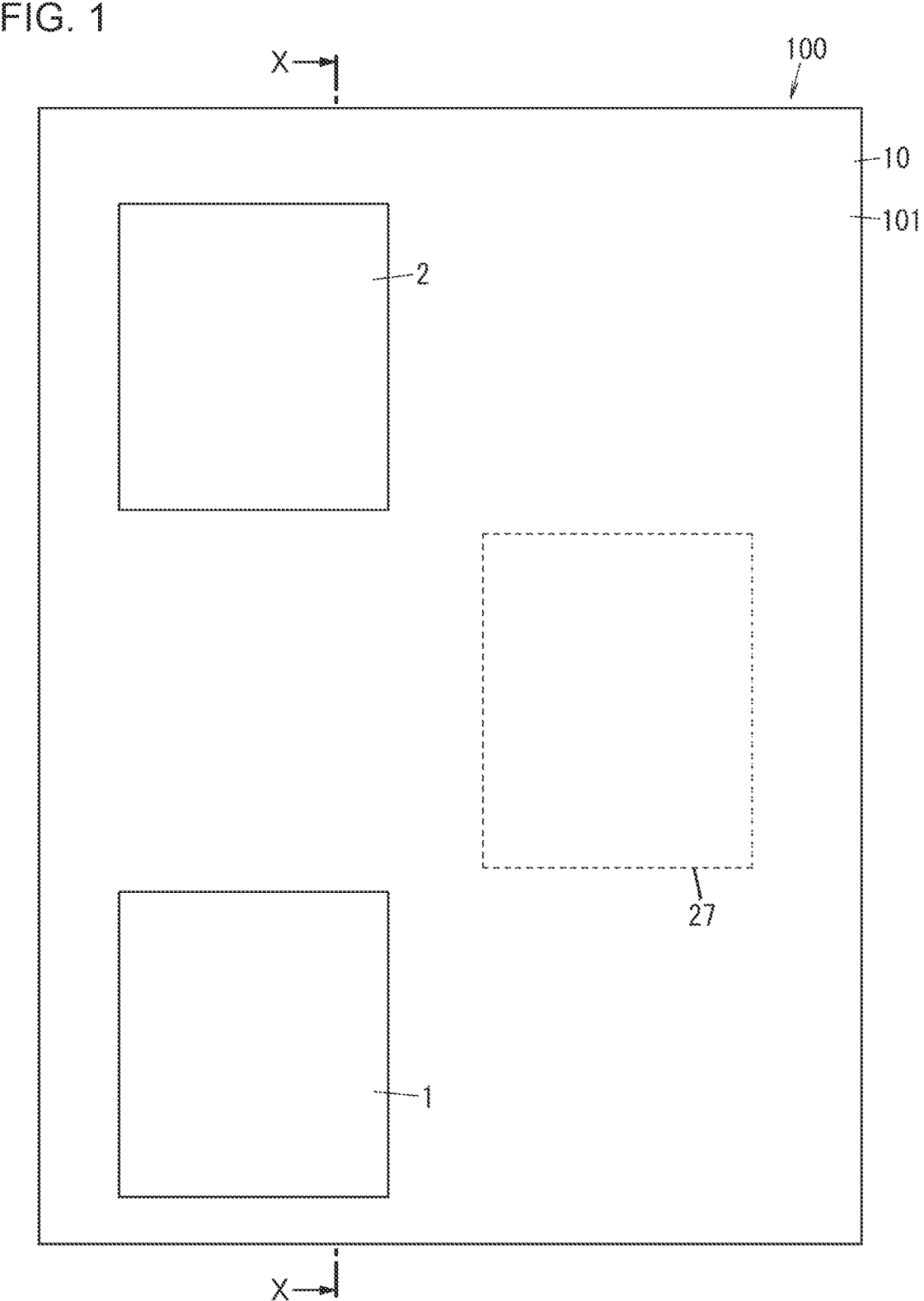
FIG. 1 is a plan view of a high-frequency module according to Embodiment 1.
Figure 2:
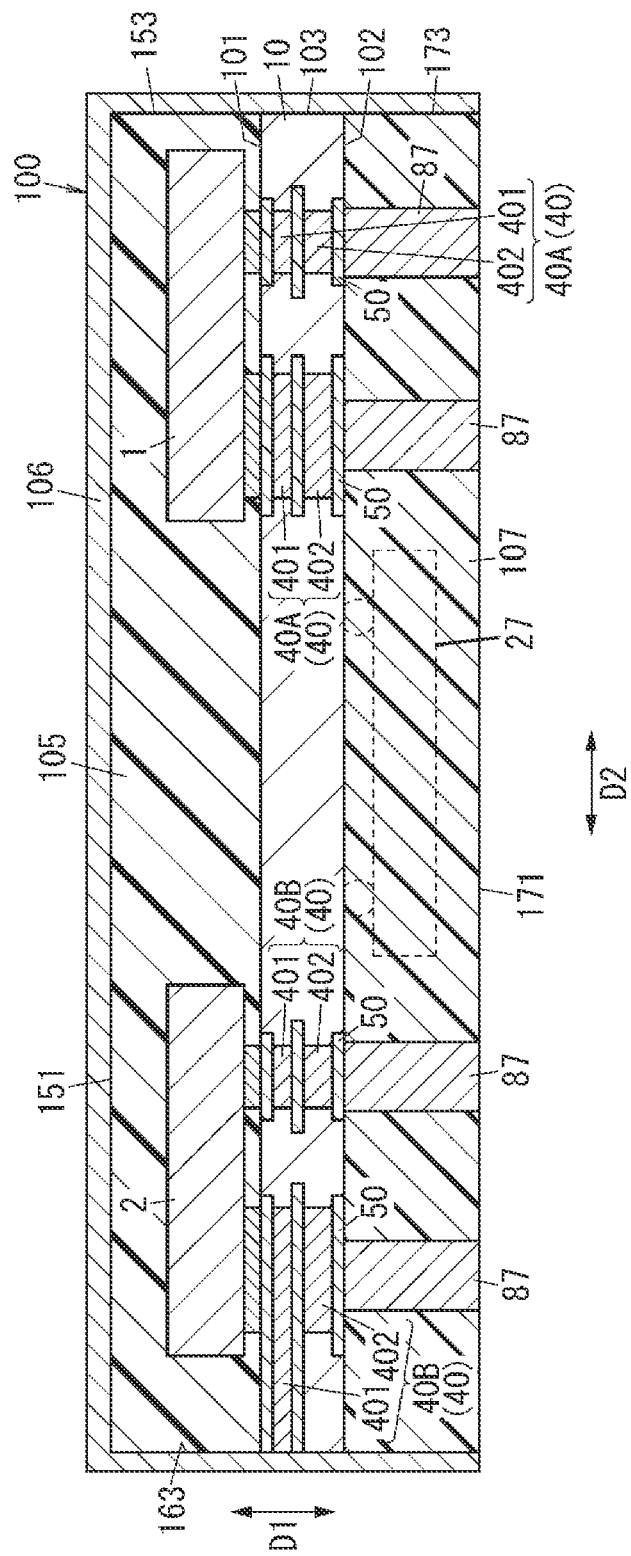
FIG. 2 relates to the high-frequency module according to Embodiment 1 and is a sectional view taken along a line X-X in FIG. 1.

As illustrated in FIG. 1 and FIG. 2, a high-frequency module 100 according to Embodiment 1 includes a mounting substrate 10, a first power amplifier 1 and a second power amplifier 2, an IC chip 27, a conductive layer 106, and a plurality of via conductors 40. The mounting substrate 10 has a first main surface 101 and a second main surface 102 opposite to each other. The first power amplifier 1 and the second power amplifier 2 are mounted on the first main surface 101 of the mounting substrate 10. The IC chip 27 is mounted on the second main surface 102 of the mounting substrate 10. A resin layer 105 is disposed on the first main surface 101 of the mounting substrate 10, and covers the first power amplifier 1 and the second power amplifier 2. The conductive layer 106 covers the resin layer 105, and covers an outer peripheral surface 103 of the mounting substrate 10. The plurality of via conductors 40 is connected to the first power amplifier 1 and the second power amplifier 2, and passes through the mounting substrate 10. At least one via conductor 40 of the plurality of via conductors 40 is in contact with the conductive layer 106.

The high-frequency module 100 according to Embodiment 1 further includes a terminal 87. The terminal 87 is disposed on the second main surface 102 of the mounting substrate 10. One via conductor 40 of the plurality of via conductors 40 is connected to the terminal 87.

Hereinafter, the high-frequency module 100 and a communication device 300 according to Embodiment 1 will be described in more detail with reference to FIG. 1 to FIG. 4B.

(1) High-Frequency Module and Communication Device (1.1) Circuit Configurations of High-Frequency Module and Communication Device First, the circuit configurations of the high-frequency module 100 and the communication device 300 according to Embodiment 1 will be described with reference to FIG. 3, FIG. 4A, and FIG. 4B.

The high-frequency module 100 is used, for example, for the communication device 300. The communication device 300 is, for example, a mobile phone (for example, a smartphone). Note that the communication device 300 is not limited to a mobile phone, and may be, for example, a wearable terminal (for example, a smart watch). The high-frequency module 100 is, for example, a module capable of supporting fourth generation mobile communication (4G) standards, fifth generation mobile communication (5G) standards, or the like. The 4G standards are, for example, Third Generation Partnership Project (3GPP) Long Term Evolution (LTE) standards. The 5G standards are, for example, 5G New Radio (NR). The high-frequency module 100 is, for example, a module capable of supporting carrier aggregation and dual connectivity.

The high-frequency module 100 is capable of supporting simultaneous communication in which a plurality of (two in Embodiment 1) frequency bands (a first frequency band and a second frequency band) is simultaneously used in an uplink. The high-frequency module 100 is configured to be capable of amplifying a transmission signal (high-frequency signal) in the first frequency band inputted from a signal processing circuit 301 by the first power amplifier 1 and outputting the amplified transmission signal to a first antenna 311. Further, the high-frequency module 100 is configured to be capable of amplifying a transmission signal (high-frequency signal) in the second frequency band inputted from the signal processing circuit 301 by the second power amplifier 2 and outputting the amplified transmission signal to a second antenna 312. Further, the high-frequency module 100 further includes a low-noise amplifier 9 and is configured to be capable of amplifying a reception signal (high-frequency signal) in the first frequency band inputted from the first antenna 311 by the low-noise amplifier 9 and outputting the amplified reception signal to the signal processing circuit 301. The signal processing circuit 301 is not a component of the high-frequency module 100, but is a component of the communication device 300 including the high-frequency module 100. The high-frequency module 100 is controlled by, for example, the signal processing circuit 301 included in the communication device 300. The communication device 300 includes the high-frequency module 100 and the signal processing circuit 301. The communication device 300 further includes the first antenna 311 and the second antenna 312. The communication device 300 further includes a circuit board on which the high-frequency module 100 is mounted. The circuit board is, for example, a printed wiring board. The circuit board includes a ground electrode to which a ground potential is applied.

The signal processing circuit 301 includes, for example, an RF signal processing circuit 302 and a baseband signal processing circuit 303. The RF signal processing circuit 302 is, for example, a Radio Frequency Integrated Circuit (RFIC), and performs signal processing on a high-frequency signal. For example, the RF signal processing circuit 302 performs signal processing such as up-conversion or the like on a high-frequency signal (transmission signal) outputted from the baseband signal processing circuit 303, and outputs the high-frequency signal subjected to the signal processing. In addition, for example, the RF signal processing circuit 302 performs signal processing such as down-conversion or the like on a high-frequency signal (reception signal) outputted from the high-frequency module 100, and outputs the high-frequency signal subjected to the signal processing to the baseband signal processing circuit 303. The baseband signal processing circuit 303 is, for example, a Baseband Integrated Circuit (BBIC). The baseband signal processing circuit 303 generates an I-phase signal and a Q-phase signal from a baseband signal. The baseband signal is, for example, an audio signal, an image signal, or the like inputted from outside. The baseband signal processing circuit 303 performs IQ modulation processing by combining the I-phase signal and the Q-phase signal, and outputs a transmission signal. At this time, the transmission signal is generated as a modulated signal (IQ signal) obtained by amplitude-modulating a carrier signal having a predetermined frequency with a period longer than a period of the carrier signal. The reception signal processed by the baseband signal processing circuit 303 is used, for example, as an image signal for image display, or as an audio signal for communication. The high-frequency module 100 transmits high-frequency signals (reception signal and transmission signal) between each of the first antenna 311 and the second antenna 312, and the RF signal processing circuit 302 of the signal processing circuit 301.

The high-frequency module 100 includes the first power amplifier 1, the second power amplifier 2, a switch 3 (hereinafter also referred to as a first switch 3), a plurality of (for example, two) first filters 4, and a second filter 5. The high-frequency module 100 further includes a controller 20. The high-frequency module 100 further includes a first output matching circuit 13, a second output matching circuit 14, a plurality of (for example, two) first matching circuits 15, and a second matching circuit 16. The high-frequency module 100 further includes the low-noise amplifier 9 and an input matching circuit 19. The high-frequency module 100 further includes a second switch 6 as a switch other than the first switch 3. The high-frequency module 100 further includes a first low-pass filter 17 and a second low-pass filter 18. The high-frequency module 100 further includes a third switch 7, a fourth switch 23, and a fifth switch 24 as switches other than the first switch 3. Each of the first filters 4 is a duplexer having a transmission filter 41 and a reception filter 42. Hereinafter, for convenience of description, when a description is given while two first filters 4 are distinguished from each other, one of the two first filters 4 may be referred to as a first filter 4A and another may be referred to as a first filter 4B. Further, the second filter 5 is a duplexer having a transmission filter 51 and a reception filter 52.

The high-frequency module 100 also includes a plurality of external connection terminals 8. The plurality of external connection terminals 8 includes a first antenna terminal 81, a second antenna terminal 82, two first signal input terminals 83, two second signal input terminals 84, a plurality of (four) control terminals 85, a signal output terminal 86, and a plurality of ground terminals (not illustrated). In FIG. 1, only one control terminal 85 of the four control terminals 85 is illustrated. The plurality of ground terminals is terminals that are electrically connected to a ground electrode of the above-described circuit board included in the communication device 300 and are supplied with a ground potential.

Hereinafter, the circuit configuration of the high-frequency module 100 will be described in more detail with reference to FIG. 3, FIG. 4A, and FIG. 4B.

The first power amplifier 1 has a first input terminal 11 and a first output terminal 12. The first power amplifier 1 amplifies a transmission signal in the first frequency band inputted to the first input terminal 11 and outputs the amplified transmission signal from the first output terminal 12. The first frequency band includes, for example, a transmission band of a communication band for Frequency Division Duplex (FDD). More specifically, the first frequency band includes a transmission band of a first communication band for FDD and a transmission band of a second communication band for FDD. The first communication band corresponds to a transmission signal that passes through the transmission filter 41 of the first filter 4A, and is, for example, Band 1, Band 3, Band 2, Band 25, Band 4, Band 66, Band 39, or Band 34 of 3GPP LTE standards, or n1, n3, n2, n25, n4, n66, n39, or n34 of 5G NR. The second communication band corresponds to a transmission signal that passes through the transmission filter 41 of the first filter 4B, and is, for example, n50 or n51 of 5G NR.

The first input terminal 11 of the first power amplifier 1 is selectively connected to the two first signal input terminals 83 with the fourth switch 23 interposed therebetween. The first input terminal 11 of the first power amplifier 1 is connected to the signal processing circuit 301 with any one of the two first signal input terminals 83 interposed therebetween. The two first signal input terminals 83 are each a terminal for inputting a high-frequency signal (transmission signal) from an external circuit (for example, the signal processing circuit 301) to the high-frequency module 100. One of the two first signal input terminals 83 is a terminal for inputting a transmission signal compliant with the 4G standards to the high-frequency module 100, and another of the two first signal input terminals 83 is a terminal for inputting a transmission signal compliant with the 5G standards to the high-frequency module 100. The first output terminal 12 of the first power amplifier 1 is connected to a common terminal 30 of the first switch 3 with the first output matching circuit 13 interposed therebetween. Thus, the first output terminal 12 of the first power amplifier 1 can be connected to the plurality of first filters 4 with the first switch 3 interposed therebetween.

Figure 4A:
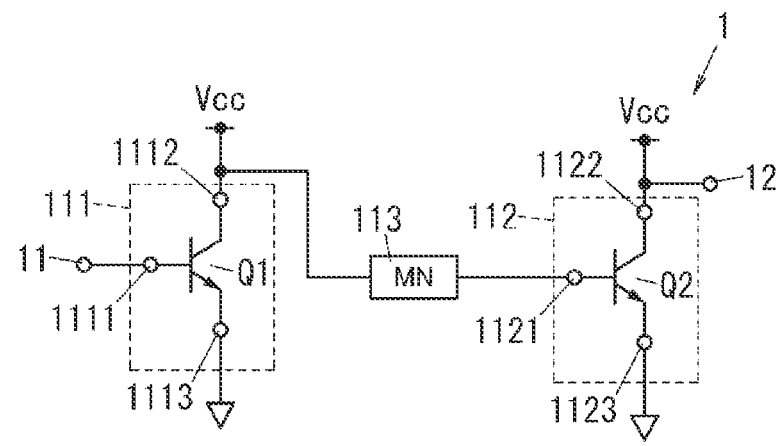
FIG. 4A is a circuit configuration diagram of a first power amplifier of the high-frequency module according to Embodiment 1.

As illustrated in FIG. 4A, the first power amplifier 1 has a first drive stage amplification unit 111, a first final stage amplification unit 112, and a first matching circuit 113. The first drive stage amplification unit 111, the first final stage amplification unit 112, and the first matching circuit 113 are provided between the first input terminal 11 and the first output terminal 12 of the first power amplifier 1. The first drive stage amplification unit 111 amplifies and outputs a high-frequency signal (transmission signal) inputted from the first input terminal 11. The first final stage amplification unit 112 amplifies and outputs the high-frequency signal outputted from the first drive stage amplification unit 111. The first matching circuit 113 is a circuit for achieving the impedance matching between the first drive stage amplification unit 111 and the first final stage amplification unit 112.

The first drive stage amplification unit 111 includes an amplifying transistor Q1. The amplifying transistor Q1 includes an input terminal 1111, an output terminal 1112, and a ground terminal 1113. The input terminal 1111 is connected to the first input terminal 11 of the first power amplifier 1. The output terminal 1112 is connected to a power supply circuit (not illustrated) for supplying a power supply voltage Vcc to the amplifying transistor Q1. The ground terminal 1113 is connected to a ground. Further, the output terminal 1112 is connected to an input terminal 1121 of an amplifying transistor Q2 of the first final stage amplification unit 112 with the first matching circuit 113 interposed therebetween. The first final stage amplification unit 112 includes the amplifying transistor Q2. The amplifying transistor Q2 has the input terminal 1121, an output terminal 1122, and a ground terminal 1123. The input terminal 1121 is connected to the output terminal 1112 of the amplifying transistor Q1 of the first drive stage amplification unit 111 with the first matching circuit 113 interposed therebetween. The output terminal 1122 is connected to a power supply circuit (not illustrated) for supplying the power supply voltage Vcc to the amplifying transistor Q2. The ground terminal 1123 is connected to the ground. Further, the output terminal 1122 is connected to the first output terminal 12 of the first power amplifier 1. The first power amplifier 1 is not limited to a multistage amplifier, and may be, for example, an in-phase combined amplifier, a differential combined amplifier, or a Doherty amplifier.

The second power amplifier 2 has a second input terminal 21 and a second output terminal 22. The second power amplifier 2 amplifies a transmission signal in the second frequency band inputted to the second input terminal 21 and outputs the amplified transmission signal from the second output terminal 22. The second frequency band is a frequency band on a higher frequency side than the first frequency band. In the high-frequency module 100 according to Embodiment 1, the first frequency band is a mid-band frequency band, and the second frequency band is a high-band frequency band. The mid-band frequency band is, for example, from equal to or greater than 1450 MHz to equal to or less than 2200 MHz. The high-band frequency band is, for example, from equal to or greater than 2300 MHz to equal to or less than 2700 MHz. Further, the second frequency band includes, for example, a transmission band of a communication band for Time Division Duplex (TDD). More specifically, the second frequency band includes a transmission band of a third communication band for TDD. The third communication band corresponds to a transmission signal passing through the transmission filter 51 of the second filter 5, and is, for example, Band 40 or Band 41 of the 3GPP LTE standards, and n40 or n41 of 5G NR.

The second input terminal 21 of the second power amplifier 2 is selectively connected to the two second signal input terminals 84 with the fifth switch 24 interposed therebetween. The second input terminal 21 of the second power amplifier 2 is connected to the signal processing circuit 301 with any one of the two second signal input terminals 84 interposed therebetween. The two second signal input terminals 84 are each a terminal for inputting a high-frequency signal (transmission signal) from an external circuit (for example, the signal processing circuit 301) to the high-frequency module 100. One of the two second signal input terminals 84 is a terminal for inputting a transmission signal compliant with the 4G standards to the high-frequency module 100, and another of the two second signal input terminals 84 is a terminal for inputting a transmission signal compliant with the 5G standards to the high-frequency module 100. The second output terminal 22 of the second power amplifier 2 is connected to the second filter 5 with the second output matching circuit 14 interposed therebetween.

Figure 4B:
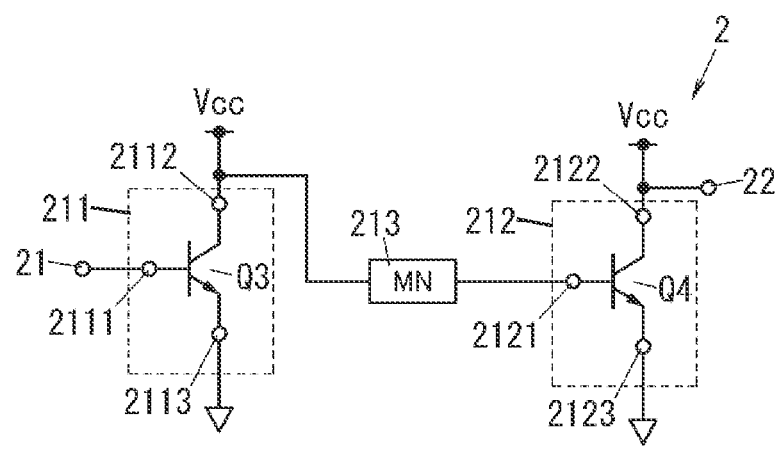
FIG. 4B is a circuit configuration diagram of a second power amplifier of the high-frequency module according to Embodiment 1.

As illustrated in FIG. 4B, the second power amplifier 2 has a second drive stage amplification unit 211, a second final stage amplification unit 212, and a second matching circuit 213. The second drive stage amplification unit 211, the second final stage amplification unit 212, and the second matching circuit 213 are provided between the second input terminal 21 and the second output terminal 22 of the second power amplifier 2. The second drive stage amplification unit 211 amplifies and outputs a high-frequency signal (transmission signal) inputted from the second input terminal 21. The second final stage amplification unit 212 amplifies and outputs the high-frequency signal outputted from the second drive stage amplification unit 211. The second matching circuit 213 is a circuit for achieving the impedance matching between the second drive stage amplification unit 211 and the second final stage amplification unit 212.

The second drive stage amplification unit 211 includes an amplifying transistor Q3. The amplifying transistor Q3 has an input terminal 2111, an output terminal 2112, and a ground terminal 2113. The input terminal 2111 is connected to the second input terminal 21 of the second power amplifier 2. The output terminal 2112 is connected to a power supply circuit (not illustrated) for supplying a power supply voltage Vcc to the amplifying transistor Q3. The ground terminal 2113 is connected to the ground. Further, the output terminal 2112 is connected to an input terminal 2121 of an amplifying transistor Q4 of the second final stage amplification unit 212 with the second matching circuit 213 interposed therebetween. The second final stage amplification unit 212 includes the amplifying transistor Q4. The amplifying transistor Q4 has the input terminal 2121, an output terminal 2122, and a ground terminal 2123. The input terminal 2121 is connected to the output terminal 2112 of the amplifying transistor Q3 of the second drive stage amplification unit 211 with the second matching circuit 213 interposed therebetween. The output terminal 2122 is connected to a power supply circuit (not illustrated) for supplying the power supply voltage Vcc to the amplifying transistor Q4. The ground terminal 2123 is connected to the ground. Further, the output terminal 2122 is connected to the second output terminal 22 of the second power amplifier 2. The second power amplifier 2 is not limited to a multistage amplifier, and may be, for example, an in-phase combined amplifier, a differential combined amplifier, or a Doherty amplifier.

In the high-frequency module 100 according to Embodiment 1, the second power amplifier 2 is of a power class higher than a power class of the first power amplifier 1. The "power class" refers to Power Class determined in 3GPP, and a power amplifier having larger maximum transmission power is of a higher power class. More specifically, a power class of a power amplifier of Power Class 1 is the highest, and power classes descend in order of a power amplifier of Power Class 2 and a power amplifier of Power Class 3. Also, in 5G NR, Power Class is determined as in 3GPP. In the high-frequency module 100 according to Embodiment 1, for example, the second power amplifier 2 is a power amplifier of Power Class 2, and the first power amplifier 1 is a power amplifier of Power Class 3. Thus, in the high-frequency module 100 according to Embodiment 1, the second power amplifier 2 having relatively large maximum transmission power has a larger heat dissipation amount than the first power amplifier 1 having relatively small maximum transmission power.

The first switch 3 has a common terminal 30, and a plurality of (for example, two) selection terminals 31. The common terminal 30 is connected to the first output terminal 12 of the first power amplifier 1 with the first output matching circuit 13 interposed therebetween. Hereinafter, for convenience of description, one of the two selection terminals 31 may be referred to as a selection terminal 31A, and another of the two selection terminals 31 may be referred to as a selection terminal 31B. In the first switch 3, the selection terminal 31A is connected to an input terminal of the transmission filter 41 of the first filter 4A, and the selection terminal 31B is connected to an input terminal of the transmission filter 41 of the first filter 4B. The first switch 3 is, for example, a switch capable of connecting at least one or more selection terminals of the plurality of selection terminals 31 to the common terminal 30. Here, the first switch 3 is, for example, a switch capable of performing the connection in a one-to-one manner and in a one-to-many manner.

The first switch 3 is, for example, a switch Integrated Circuit (IC). The first switch 3 is controlled by, for example, the controller 20. In this case, the first switch 3 is controlled by the controller 20 and switches the connection states between the common terminal 30 and the plurality of selection terminals 31. For example, the first switch 3 only needs to be configured to switch the connection states between the common terminal 30 and the plurality of selection terminals 31, in accordance with a digital control signal inputted from the controller 20. The first switch 3 may be controlled by the signal processing circuit 301. In this case, the first switch 3 switches the connection states between the common terminal 30 and the plurality of selection terminals 31 in accordance with a control signal from the RF signal processing circuit 302 of the signal processing circuit 301.

As described above, each of the first filters 4 is the duplexer having the transmission filter 41 and the reception filter 42. The transmission filter 41 of the first filter 4A is, for example, a band pass filter whose pass band is a transmission band of the first communication band. The transmission filter 41 of the first filter 4B is, for example, a band pass filter whose pass band is a transmission band of the second communication band. The reception filter 42 of the first filter 4A is, for example, a band pass filter whose pass band is a reception band of the first communication band. The reception filter 42 of the first filter 4B is, for example, a band pass filter whose pass band is a reception band of the second communication band.

As described-above, the second filter 5 is the duplexer having the transmission filter 51 and the reception filter 52. The transmission filter 51 of the second filter 5 is, for example, a band pass filter whose pass band is a transmission band of the third communication band. The reception filter 52 of the second filter 5 is, for example, a band pass filter whose pass band is a reception band of the third communication band.

The controller 20 is connected to the first power amplifier 1 and the second power amplifier 2. Further, the controller 20 is connected to the signal processing circuit 301 with the plurality of (for example, four) control terminals 85 interposed therebetween. In FIG. 1, only one of the four control terminals 85 is illustrated. The plurality of control terminals 85 is terminals for inputting control signals from an external circuit (for example, the signal processing circuit 301) to the controller 20. The controller 20 controls the first power amplifier 1 and the second power amplifier 2 based on the control signals acquired from the plurality of control terminals 85. The controller 20 controls the first power amplifier 1 and the second power amplifier 2 in accordance with a control signal from the RF signal processing circuit 302 of the signal processing circuit 301. For example, the controller 20 only needs to be configured to control the first power amplifier 1 and the second power amplifier 2 based on the digital control signal acquired from the signal processing circuit 301.

The first output matching circuit 13 is provided on a signal path between the first output terminal 12 of the first power amplifier 1 and the common terminal 30 of the first switch 3. The first output matching circuit 13 is a circuit for achieving the impedance matching between the first power amplifier 1 and the transmission filters 41 of the two first filters 4. The first output matching circuit 13 includes, for example, one inductor, but is not limited thereto, and may be configured to include, for example, a plurality of inductors and a plurality of capacitors, or may be configured to include a transformer.

The second output matching circuit 14 is provided on a signal path between the second output terminal 22 of the second power amplifier 2 and the transmission filter 51 of the second filter 5. The second output matching circuit 14 is a circuit for achieving the impedance matching between the second power amplifier 2 and the transmission filter 51 of the second filter 5. The second output matching circuit 14 includes, for example, one inductor, but is not limited thereto, and may be configured to include, for example, a plurality of inductors and a plurality of capacitors, or may be configured to include a transformer.

The plurality of (for example, two) first matching circuits 15 corresponds to the plurality of (for example, two) first filters 4 in a one-to-one manner. Hereinafter, for convenience of description, the first matching circuit 15, of the plurality of first matching circuits 15, corresponding to the first filter 4A may be referred to as a first matching circuit 15A, and the first matching circuit 15 corresponding to the first filter 4B may be referred to as a first matching circuit 15B. The first matching circuit 15A is provided on a signal path between the first filter 4A and the third switch 7. The first matching circuit 15A is a circuit for achieving the impedance matching between the first filter 4A and the third switch 7. The first matching circuit 15B is provided on a signal path between the first filter 4B and the third switch 7. The first matching circuit 15B is a circuit for achieving the impedance matching between the first filter 4B and the third switch 7. Each of the first matching circuit 15 includes, for example, one inductor, but is not limited thereto, and may be configured to include, for example, a plurality of inductors and a plurality of capacitors.

The second matching circuit 16 is provided on a signal path between the second filter 5 and the third switch 7. The second matching circuit 16 is a circuit for achieving the impedance matching between the second filter 5 and the third switch 7. The second matching circuit 16 includes, for example, one inductor, but is not limited thereto, and may be configured to include, for example, a plurality of inductors and a plurality of capacitors.

The low-noise amplifier 9 has an input terminal 91 and an output terminal 92. The low-noise amplifier 9 amplifies a reception signal in the first frequency band inputted to the input terminal 91 and outputs the amplified reception signal from the output terminal 92. The input terminal 91 of the low-noise amplifier 9 is connected to a common terminal 60 of the second switch 6 with the input matching circuit 19 interposed therebetween. The output terminal 92 of the low-noise amplifier 9 is connected to the signal output terminal 86. The output terminal 92 of the low-noise amplifier 9 is connected to, for example, the signal processing circuit 301 with the signal output terminal 86 interposed therebetween. The signal output terminal 86 is a terminal for outputting a high-frequency signal (reception signal) from the low-noise amplifier 9 to an external circuit (for example, the signal processing circuit 301).

The input matching circuit 19 is provided on a signal path between the input terminal 91 of the low-noise amplifier 9 and the common terminal 60 of the second switch 6. The input matching circuit 19 is a circuit for achieving the impedance matching between the low-noise amplifier 9 and the reception filter 42 of each first filter 4. The input matching circuit 19 includes, for example, one inductor, but is not limited thereto, and may be configured to include, for example, a plurality of inductors and a plurality of capacitors.

The second switch 6 has the common terminal 60, and a plurality of (for example, three) selection terminals 61. The common terminal 60 is connected to the input terminal 91 of the low-noise amplifier 9 with the input matching circuit 19 interposed therebetween. In the second switch 6, one selection terminal 61 of the three selection terminals 61 is connected to an output terminal of the reception filter 42 of the first filter 4A, another selection terminal 61 of the three selection terminals 61 is connected to an output terminal of the reception filter 42 of the first filter 4B, and remaining one selection terminal 61 of the three selection terminals 61 is connected to an output terminal of the reception filter 52 of the second filter 5. The second switch 6 is, for example, a switch capable of connecting at least one or more selection terminals of the plurality of selection terminals 61 to the common terminal 60. Here, the second switch 6 is, for example, a switch capable of performing connection in a one-to-one manner and in a one-to-many manner.

The second switch 6 is, for example, a switch IC. The second switch 6 is controlled by, for example, the signal processing circuit 301. In this case, the second switch 6 switches the connection states between the common terminal 60 and the plurality of selection terminals 61 in accordance with a control signal from the RF signal processing circuit 302 of the signal processing circuit 301. For example, the second switch 6 only needs to be configured to switch the connection states between the common terminal 60 and the plurality of selection terminals 61 in accordance with a digital control signal inputted from the signal processing circuit 301. The second switch 6 may be controlled by the controller 20, instead of being controlled by the signal processing circuit 301.

The third switch 7 has a first common terminal 70A, a second common terminal 70B, a plurality of (for example, two) first selection terminals 71 connectable to the first common terminal 70A, and a second selection terminal 72 connectable to the second common terminal 70B. The first common terminal 70A is connected to a first antenna terminal 81 with the first low-pass filter 17 interposed therebetween. The first antenna 311 is connected to the first antenna terminal 81. The plurality of first selection terminals 71 is connected to the plurality of first matching circuits 15 in a one-to-one manner. The plurality of first selection terminals 71 is connected to a node between an output terminal of the transmission filter 41 and an input terminal of the reception filter 42 in the corresponding first filter 4 of the plurality of first filters 4. The third switch 7 is, for example, a switch capable of connecting at least one or more first selection terminals of the plurality of first selection terminals 71 to the first common terminal 70A. Here, the third switch 7 is, for example, a switch capable of performing connection in a one-to-one manner and in a one-to-many manner.

The third switch 7 is, for example, a switch IC. The third switch 7 is controlled by, for example, the signal processing circuit 301. In this case, the third switch 7 switches the connection states between the first common terminal 70A and the plurality of first selection terminals 71, and the connection states between the second common terminal 70B and the second selection terminal 72 in accordance with a control signal from the RF signal processing circuit 302 of the signal processing circuit 301. For example, the third switch 7 only needs to be configured to switch the connection states between the first common terminal 70A and the plurality of first selection terminals 71, and the connection states between the second common terminal 70B and the second selection terminal 72 in accordance with a digital control signal inputted from the signal processing circuit 301. The third switch 7 may be controlled by the controller 20, instead of being controlled by the signal processing circuit 301.

The fourth switch 23 includes a common terminal 230, and a plurality of (for example, two) selection terminals 231. The common terminal 230 is connected to the first input terminal 11 of the first power amplifier 1. The two selection terminals 231 are connected to the two first signal input terminals 83 in a one-to-one manner.

The fourth switch 23 is, for example, a switch IC. The fourth switch 23 is controlled by, for example, the controller 20. In this case, the fourth switch 23 is controlled by the controller 20 and switches the connection states between the common terminal 230 and the plurality of selection terminals 231. For example, the fourth switch 23 only needs to be configured to switch the connection states between the common terminal 230 and the plurality of selection terminals 231, in accordance with a digital control signal inputted from the controller 20. The fourth switch 23 may be controlled by the signal processing circuit 301. In this case, the fourth switch 23 switches the connection states between the common terminal 230 and the plurality of selection terminals 231 in accordance with a control signal from the RF signal processing circuit 302 of the signal processing circuit 301.

The fifth switch 24 has a common terminal 240 and a plurality of (for example, two) selection terminals 241. The common terminal 240 is connected to the second input terminal 21 of the second power amplifier 2. The two selection terminals 241 are connected to the two second signal input terminals 84 in a one-to-one manner.

The fifth switch 24 is, for example, a switch IC. The fifth switch 24 is controlled by, for example, the controller 20. In this case, the fifth switch 24 is controlled by the controller 20 and switches the connection states between the common terminal 240 and the plurality of selection terminals 241. For example, the fifth switch 24 only needs to be configured to switch the connection states between the common terminal 240 and the plurality of selection terminals 241, in accordance with a digital control signal inputted from the controller 20. The fifth switch 24 may be controlled by the signal processing circuit 301. In this case, the fifth switch 24 switches the connection states between the common terminal 240 and the plurality of selection terminals 241 in accordance with a control signal from the RF signal processing circuit 302 of the signal processing circuit 301.

The first low-pass filter 17 is connected between the first antenna terminal 81 and the first common terminal 70A of the third switch 7. The first low-pass filter 17 includes, for example, a plurality of inductors and capacitors. The first low-pass filter 17 may be an Integrated Passive Device (IPD) including a plurality of inductors and capacitors.

The second low-pass filter 18 is connected between the second antenna terminal 82 and the second common terminal 70B of the third switch 7. The second low-pass filter 18 includes, for example, a plurality of inductors and capacitors. The second low-pass filter 18 may be an IPD including a plurality of inductors and capacitors.

(1.2) Structure of High-Frequency Module

Next, the structure of the high-frequency module 100 will be described with reference to FIG. 1 and FIG. 2.

The high-frequency module 100 further includes the mounting substrate 10. The mounting substrate 10 has the first main surface 101 and the second main surface 102 opposite to each other in a thickness direction D1 of the mounting substrate 10. The mounting substrate 10 is, for example, a multilayer substrate including a plurality of dielectric layers and a plurality of conductive layers. The plurality of dielectric layers and the plurality of conductive layers are stacked in the thickness direction D1 of the mounting substrate 10. In the plurality of conductive layers, each layer is formed to have a corresponding predetermined pattern. Each of the conductive layers includes one or more conductive patterns 50 (see FIG. 2) in one plane orthogonal to the thickness direction D1 of the mounting substrate 10. A material of each conductive layer is, for example, copper. The plurality of conductive layers includes a ground layer. In the high-frequency module 100, a plurality of ground terminals and the ground layer are electrically connected with the via conductor 40 (see FIG. 2) or the like included in the mounting substrate 10 interposed therebetween. The mounting substrate 10 is, for example, a Low Temperature Co-fired Ceramics (LTCC) substrate. The mounting substrate 10 is not limited to an LTCC substrate, and may be, for example, a printed wiring board, a High Temperature Co-fired Ceramics (HTCC) substrate, or a resin multilayer substrate.

In addition, the mounting substrate 10 is not limited to an LTCC substrate, and may be, for example, a wiring structure. The wiring structure is, for example, a multilayer structure. The multilayer structure includes at least one insulating layer and at least one conductive layer. The insulating layer is formed in a predetermined pattern. When there is a plurality of insulating layers, each of the insulating layers is formed to have a corresponding predetermined pattern. The conductive layer is formed in a predetermined pattern different from the predetermined pattern of the insulating layer. When there is a plurality of conductive layers, each of the conductive layers is formed to have a corresponding predetermined pattern. The conductive layer may include one or more rewiring portions. In the wiring structure, a first surface of two surfaces facing each other in a thickness direction of the multilayer structure is the first main surface 101 of the mounting substrate 10, and a second surface is the second main surface 102 of the mounting substrate 10. The wiring structure may be, for example, an interposer. The interposer may be an interposer in which a silicon substrate is used, or may be a substrate formed of multiple layers.

The first main surface 101 and the second main surface 102 of the mounting substrate 10 are separated from each other in the thickness direction D1 of the mounting substrate 10, and intersect the thickness direction D1 of the mounting substrate 10. The first main surface 101 of the mounting substrate 10 is, for example, orthogonal to the thickness direction D1 of the mounting substrate 10, but may include, for example, a side surface of a conductive portion or the like as a surface not orthogonal to the thickness direction D1. Further, the second main surface 102 of the mounting substrate 10 is, for example, orthogonal to the thickness direction D1 of the mounting substrate 10, but may include, for example, a side surface of the conductive pattern 50 or the like as a surface not orthogonal to the thickness direction D1. In addition, the first main surface 101 and the second main surface 102 of the mounting substrate 10 may be formed with fine irregularities, concave portions, or convex portions. For example, when a concave portion is formed in the first main surface 101 of the mounting substrate 10, an inner surface of the concave portion is included in the first main surface 101.

In the high-frequency module 100 according to Embodiment 1, first-group circuit components of a plurality of circuit components are mounted on the first main surface 101 of the mounting substrate 10. The first-group circuit components include the first power amplifier 1, the second power amplifier 2, the plurality of first filters 4, the second filter 5, the first output matching circuit 13, the second output matching circuit 14, the plurality of first matching circuits 15, the second matching circuit 16, the first low-pass filter 17, the second low-pass filter 18, and the input matching circuit 19. "A circuit component is mounted on the first main surface 101 of the mounting substrate 10" means that the circuit component is disposed on (mechanically connected to) the first main surface 101 of the mounting substrate 10, and that the circuit component is electrically connected to (an appropriate conductive pattern 50 of) the mounting substrate 10. In the high-frequency module 100, second-group circuit components of the plurality of circuit components are mounted on the second main surface 102 of the mounting substrate 10. The second-group circuit components include the first switch 3, the second switch 6, the third switch 7, the low-noise amplifier 9, the controller 20, the fourth switch 23, and the fifth switch 24. "A circuit component is mounted on the second main surface 102 of the mounting substrate 10" includes that the circuit component is disposed on (mechanically connected to) the second main surface 102 of the mounting substrate 10, and that the circuit component is electrically connected to (an appropriate conductive pattern 50 of) the mounting substrate 10.

FIG. 1 and FIG. 2 illustrate only the first power amplifier 1 and the second power amplifier 2, of the first-group circuit components mounted on the first main surface 101 of the mounting substrate 10. Further, FIG. 1 and FIG. 2 illustrate only the IC chip 27 including the controller 20, of the second-group circuit components mounted on the second main surface 102 of the mounting substrate 10. In the high-frequency module 100 according to Embodiment 1, the IC chip 27 including the controller 20 constitutes an electronic component.

The first power amplifier 1 is an IC chip for power amplification. As illustrated in FIG. 1 and FIG. 2, the first power amplifier 1 is mounted on the first main surface 101 of the mounting substrate 10. In plan view in the thickness direction D1 of the mounting substrate 10, an outer peripheral shape of the first power amplifier 1 is a quadrangular shape. The first power amplifier 1 is an IC chip including a substrate having a first main surface and a second main surface opposite to each other, and a circuit unit formed on a side of the first main surface of the substrate. The substrate is, for example, a gallium arsenide substrate. The circuit unit includes the first drive stage amplification unit 111 connected to the first input terminal 11 of the first power amplifier 1, the first final stage amplification unit 112 connected to an output end of the first drive stage amplification unit 111, and the first matching circuit 113 provided between the first drive stage amplification unit 111 and the first final stage amplification unit 112. As described above, the first drive stage amplification unit 111 includes the amplifying transistor Q1. As described-above, the first final stage amplification unit 112 includes the amplifying transistor Q2. Each of the amplifying transistors Q1 and Q2 is, for example, a Heterojunction Bipolar Transistor (HBT). The first power amplifier 1 may include, for example, a capacitor for cutting direct current. The first power amplifier 1 is flip-chip mounted on the first main surface 101 of the mounting substrate 10 such that the first main surface out of the first main surface and the second main surface of the substrate of the first power amplifier 1 is on a side of the first main surface 101 of the mounting substrate 10. The substrate of the first power amplifier 1 is not limited to a gallium arsenide substrate, and may be, for example, a silicon substrate, a silicon germanium substrate, or a gallium nitride substrate. Further, each of the amplifying transistors Q1 and Q2 is not limited to an HBT, and may be a bipolar transistor or a Field Effect Transistor (FET). The FET is, for example, a Metal-Oxide-Semiconductor Field Effect Transistor (MOSFET). The IC chip constituting the first power amplifier 1 is not limited to a GaAs-based IC chip, and may be, for example, a Si-based IC chip, a SiGe-based IC chip, or a GaN-based IC chip.

The second power amplifier 2 is an IC chip for power amplification. As illustrated in FIG. 1 and FIG. 2, the second power amplifier 2 is mounted on the first main surface 101 of the mounting substrate 10. In plan view in the thickness direction D1 of the mounting substrate 10, an outer peripheral shape of the second power amplifier 2 is a quadrangular shape. The second power amplifier 2 is an IC chip including a substrate having a first main surface and a second main surface opposite to each other, and a circuit unit formed on a side of the first main surface of the substrate. The substrate is, for example, a gallium arsenide substrate. The circuit unit includes the second drive stage amplification unit 211 connected to the second input terminal 21 of the second power amplifier 2, the second final stage amplification unit 212 connected to an output end of the second drive stage amplification unit 211, and the second matching circuit 213 provided between the second drive stage amplification unit 211 and the second final stage amplification unit 212. As described above, the second drive stage amplification unit 211 includes the amplifying transistor Q3. As described-above, the second final stage amplification unit 212 includes the amplifying transistor Q4. Each of the amplifying transistors Q3 and Q4 is, for example, a Heterojunction Bipolar Transistor (HBT). The second power amplifier 2 may include, for example, a capacitor for cutting direct current. The second power amplifier 2 is flip-chip mounted on the first main surface 101 of the mounting substrate 10 such that the first main surface out of the first main surface and the second main surface of the substrate of the second power amplifier 2 is on a side of the first main surface 101 of the mounting substrate 10. The substrate of the second power amplifier 2 is not limited to a gallium arsenide substrate, and may be, for example, a silicon substrate, a silicon germanium substrate, or a gallium nitride substrate. Further, each of the amplifying transistors Q3 and Q4 is not limited to an HBT, and may be a bipolar transistor or a Field Effect Transistor (FET). The FET is, for example, a Metal-Oxide- Semiconductor Field Effect Transistor (MOSFET). The IC chip constituting the second power amplifier 2 is not limited to a GaAs-based IC chip, and may be, for example, a Si-based IC chip, a SiGe-based IC chip, or a GaN-based IC chip.

Each of the transmission filters 41 and the reception filters 42 of the two first filters 4 is, for example, a ladder-type filter, and has a plurality of (for example, four) series arm resonators and a plurality of (for example, three) parallel arm resonators. Each of the two transmission filters 41 and the two reception filters 42 is, for example, an acoustic wave filter. In the acoustic wave filter, each of the series arm resonators and the parallel arm resonators is configured with an acoustic wave resonator. The acoustic wave filter is, for example, a surface acoustic wave filter in which a surface acoustic wave is utilized.

In the surface acoustic wave filter, each of the series arm resonators and the parallel arm resonators is, for example, a Surface Acoustic Wave (SAW) resonator.

The surface acoustic wave filter has, for example, a substrate having piezoelectricity, a plurality of Interdigital Transducer (IDT) electrodes provided on the substrate having piezoelectricity and corresponding to the plurality of series arm resonators in a one-to-one manner, and a plurality of IDT electrodes provided on the substrate having piezoelectricity and corresponding to the plurality of parallel arm resonators in a one-to-one manner. The substrate having piezoelectricity is, for example, a piezoelectric substrate. The piezoelectric substrate is, for example, a lithium niobate substrate, a lithium tantalate substrate, or a quartz substrate. The substrate having piezoelectricity is not limited to a piezoelectric substrate, and may be, for example, a stack-type substrate including a silicon substrate, a high-acoustic velocity film on the silicon substrate, a low-acoustic velocity film on the high-acoustic velocity film, and a piezoelectric layer on the low-acoustic velocity film. In the stack-type substrate, a material of the piezoelectric layer is, for example, lithium niobate or lithium tantalate. The low-acoustic velocity film is a film in which acoustic velocity of a bulk wave propagating through the low-acoustic velocity film is lower than acoustic velocity of a bulk wave propagating through the piezoelectric layer. A material of the low-acoustic velocity film is, for example, silicon oxide. The high-acoustic velocity film is a film in which acoustic velocity of a bulk wave propagating through the high-acoustic velocity film is higher than acoustic velocity of an acoustic wave propagating through the piezoelectric layer. A material of the high-acoustic velocity film is, for example, silicon nitride.

Although not illustrated, the two first filters 4 are mounted on the first main surface 101 of the mounting substrate 10. In plan view in the thickness direction D1 of the mounting substrate 10, an outer peripheral shape of each of the two first filters 4 is a quadrangular shape.

Each of the transmission filter 51 and the reception filter 52 of the second filter 5 is, for example, a ladder-type filter, and has a plurality of (for example, four) series arm resonators and a plurality of (for example, three) parallel arm resonators. Each of the transmission filter 51 and the reception filter 52 is, for example, an acoustic wave filter. In the acoustic wave filter, each of the series arm resonators and the parallel arm resonators is configured with an acoustic wave resonator. The acoustic wave filter is, for example, a surface acoustic wave filter in which a surface acoustic wave is utilized.

Although not illustrated, the second filter 5 is mounted on the first main surface 101 of the mounting substrate 10. In plan view in the thickness direction D1 of the mounting substrate 10, an outer peripheral shape of the second filter 5 is a quadrangular shape.

Although not illustrated, a circuit component (inductor) of the first output matching circuit 13 is mounted on the first main surface 101 of the mounting substrate 10. In plan view in the thickness direction D1 of the mounting substrate 10, an outer peripheral shape of the circuit component of the first output matching circuit 13 is a quadrangular shape. The circuit component of the first output matching circuit 13 is, for example, a chip inductor. The first output matching circuit 13 may include an inner layer inductor provided in the mounting substrate 10.

Although not illustrated, a circuit component (inductor) of the second output matching circuit 14 is mounted on the first main surface 101 of the mounting substrate 10. In plan view in the thickness direction D1 of the mounting substrate 10, an outer peripheral shape of the circuit component of the second output matching circuit 14 is a quadrangular shape. The circuit component of the second output matching circuit 14 is, for example, a chip inductor. The second output matching circuit 14 may include an inner layer inductor provided in the mounting substrate 10.

Although not illustrated, a circuit component (inductor) of each of the two first matching circuits 15 and the second matching circuit 16 is mounted on the first main surface 101 of the mounting substrate 10. In plan view in the thickness direction D1 of the mounting substrate 10, an outer peripheral shape of the circuit component of each of the two first matching circuits 15 and the second matching circuit 16 is a quadrangular shape. The circuit component of each of the two first matching circuits 15 and the second matching circuit 16 is, for example, a chip inductor. Each of the two first matching circuits 15 and the second matching circuit 16 may include an inner layer inductor provided in the mounting substrate 10.

Although not illustrated, a circuit component (inductor) of the input matching circuit 19 is mounted on the first main surface 101 of the mounting substrate 10. In plan view in the thickness direction D1 of the mounting substrate 10, an outer peripheral shape of the circuit component of the input matching circuit 19 is a quadrangular shape. The circuit component of the input matching circuit 19 is, for example, a chip inductor. The input matching circuit 19 may include an inner layer inductor provided in the mounting substrate 10.

Although not illustrated, the first low-pass filter 17 and the second low-pass filter 18 are mounted on the first main surface 101 of the mounting substrate 10. A cutoff frequency of the first low-pass filter 17 is higher than an upper limit of the first frequency band. A cutoff frequency of the second low-pass filter 18 is higher than an upper limit of the second frequency band.

Although not illustrated, the first switch 3, the fourth switch 23, and the fifth switch 24 are mounted on the second main surface 102 of the mounting substrate 10. In plan view in the thickness direction D1 of the mounting substrate 10, an outer peripheral shape of each of the first switch 3, the fourth switch 23, and the fifth switch 24 is a quadrangular shape. Each of the first switch 3, the fourth switch 23, and the fifth switch 24 is, for example, an IC chip including a substrate having a first main surface and a second main surface opposite to each other, and a circuit unit formed on a side of the first main surface of the substrate. The substrate is, for example, a silicon substrate. The circuit unit includes a plurality of FETs as a plurality of switching elements. Each of the switching elements is not limited to an FET, and may be, for example, a bipolar transistor. Each of the first switch 3, the fourth switch 23, and the fifth switch 24 is flip-chip mounted on the second main surface 102 of the mounting substrate 10 such that the first main surface out of the first main surface and the second main surface of the substrate of these switches is on a side of the second main surface 102 of the mounting substrate 10. At least one of the first switch 3, the fourth switch 23, and the fifth switch 24 may be included in the IC chip 27. In addition, two or more of the first switch 3, the fourth switch 23, and the fifth switch 24 may be included in one IC chip.

Although not illustrated, the low-noise amplifier 9 is mounted on the second main surface 102 of the mounting substrate 10. In plan view in the thickness direction D1 of the mounting substrate 10, an outer peripheral shape of the low-noise amplifier 9 is a quadrangular shape. The low-noise amplifier 9 is, for example, an IC chip including a substrate having a first main surface and a second main surface opposite to each other, and a circuit unit formed on a side of the first main surface of the substrate. The substrate is, for example, a silicon substrate. The circuit unit includes an FET as an amplifying transistor for amplifying a reception signal inputted to the input terminal of the low-noise amplifier 9. The amplifying transistor is not limited to an FET, and may be, for example, a bipolar transistor. The low-noise amplifier 9 is flip-chip mounted on the second main surface 102 of the mounting substrate 10 such that the first main surface out of the first main surface and the second main surface of the substrate of the low-noise amplifier 9 is on a side of the second main surface 102 of the mounting substrate 10.

Although not illustrated, the second switch 6 and the third switch 7 are mounted on the second main surface 102 of the mounting substrate 10. In plan view in the thickness direction D1 of the mounting substrate 10, an outer peripheral shape of each of the second switch 6 and the third switch 7 is a quadrangular shape. Each of the second switch 6 and the third switch 7 is, for example, an IC chip including a substrate having a first main surface and a second main surface opposite to each other, and a circuit unit formed on a side of the first main surface of the substrate. The substrate is, for example, a silicon substrate. The circuit unit includes a plurality of FETs as a plurality of switching elements. Each of the switching elements is not limited to an FET, and may be, for example, a bipolar transistor. Each of the second switch 6 and the third switch 7 is flip-chip mounted on the second main surface 102 of the mounting substrate 10 such that the first main surface out of the first main surface and the second main surface of the substrate of these switches is on a side of the second main surface 102 of the mounting substrate 10. At least one of the second switch 6 and the third switch 7 may be included in one IC chip together with the low-noise amplifier 9. Further, the second switch 6 and the third switch 7 may be included in one IC chip.

In the high-frequency module 100 according to Embodiment 1, the IC chip 27 including the controller 20 is mounted on the second main surface 102 of the mounting substrate 10. In plan view in the thickness direction D1 of the mounting substrate 10, an outer peripheral shape of the IC chip 27 is a quadrangular shape. The IC chip 27 is a Si-based IC chip, but is not limited thereto.

Although not illustrated, the plurality of external connection terminals 8 is disposed on the second main surface 102 of the mounting substrate 10. "The external connection terminal 8 is disposed on the second main surface 102 of the mounting substrate 10" means that the external connection terminal 8 is mechanically connected to the second main surface 102 of the mounting substrate 10, and that the external connection terminal 8 is electrically connected to (an appropriate conductive pattern 50 of) the mounting substrate 10. A material of the plurality of external connection terminals 8 is, for example, metal (for example, copper, a copper alloy, or the like). Each of the external connection terminals 8 is a columnar electrode. The columnar electrode is, for example, an electrode having a cylindrical shape. The plurality of external connection terminals 8 is bonded to the conductive pattern 50 of the mounting substrate 10 by, for example, solder, but the bonding method is not limited thereto, and, for example, the plurality of external connection terminals 8 may be bonded using a conductive adhesive (for example, conductive paste), or may be directly bonded to the conductive pattern 50 of the mounting substrate 10.

As described above, the plurality of external connection terminals 8 includes the first antenna terminal 81, the second antenna terminal 82, the plurality of first signal input terminals 83, the plurality of second signal input terminals 84, the plurality of control terminals 85, the signal output terminal 86, and the plurality of ground terminals (not illustrated). The plurality of ground terminals is electrically connected to a ground layer of the mounting substrate 10. The ground layer is a circuit ground of the high-frequency module 100, and the plurality of circuit components of the high-frequency module 100 includes a circuit component electrically connected to the ground layer.

The high-frequency module 100 according to Embodiment 1 further includes a plurality of (for example, three) terminals 87. The plurality of terminals 87 is disposed on the second main surface 102 of the mounting substrate 10. "The terminal 87 is disposed on the second main surface 102 of the mounting substrate 10" means that the terminal 87 is mechanically connected to the second main surface 102 of the mounting substrate 10, and that the terminal 87 is electrically connected to (an appropriate conductive pattern 50 of) the mounting substrate 10. A material of the plurality of terminals 87 is, for example, metal (for example, copper, a copper alloy, or the like). Each of the terminals 87 is formed in a cylindrical shape. The plurality of terminals 87 is terminals for dissipating the heat generated in the first power amplifier 1 and the second power amplifier 2. The plurality of terminals 87 is bonded to the conductive pattern 50 of the mounting substrate 10 by, for example, solder, but the bonding method is not limited thereto, and, for example, the plurality of terminals 87 may be bonded using a conductive adhesive (for example, conductive paste), or may be directly bonded to the conductive pattern 50 of the mounting substrate 10. In the high-frequency module 100 according to Embodiment 1, two terminals 87 of the plurality of terminals 87 are connected to the first power amplifier 1, and remaining two terminals 87 of the plurality of terminals 87 are connected to the second power amplifier 2.

The high-frequency module 100 further includes a first resin layer 105. The first resin layer 105 covers each of the first-group circuit components mounted on the first main surface 101 of the mounting substrate 10. The first resin layer 105 contains resin (for example, an epoxy resin). The first resin layer 105 may contain a filler in addition to the resin.

In addition, the high-frequency module 100 further includes a second resin layer 107 separately from the first resin layer 105 disposed on the first main surface 101 of the mounting substrate 10. The second resin layer 107 covers the second-group circuit components mounted on the second main surface 102 of the mounting substrate 10, an outer peripheral surface of each of the external connection terminals 8, and an outer peripheral surface of each of the terminals 87. The second resin layer 107 contains resin (for example, an epoxy resin). The second resin layer 107 may contain a filler in addition to the resin. A material of the second resin layer 107 may be the same material as or a different material from the material of the first resin layer 105.

The second resin layer 107 may be formed so as to expose a main surface of each of the second-group circuit components mounted on the second main surface 102 of the mounting substrate 10. The main surface is a surface on an opposite side from a side of the mounting substrate 10.

The high-frequency module 100 further includes the conductive layer 106. The conductive layer 106 has conductivity. The conductive layer 106 is provided for the purpose of electromagnetic shielding inside and outside the high-frequency module 100. The conductive layer 106 has multilayer structure in which a plurality of metal layers is stacked, but the structure is not limited thereto, and the conductive layer 106 may be a single metal layer. The metal layer contains one or more kinds of metal. The conductive layer 106 covers a main surface 151 of the first resin layer 105 on an opposite side from a side of the mounting substrate 10, an outer peripheral surface 153 of the first resin layer 105, and the outer peripheral surface 103 of the mounting substrate 10. Further, the conductive layer 106 also covers an outer peripheral surface 173 of the second resin layer 107. That is, the conductive layer 106 covers at least a part of the resin layer 105. The conductive layer 106 is in contact with at least a part of an outer peripheral surface of the ground layer included in the mounting substrate 10. Thus, an electrical potential of the conductive layer 106 can be made equal to an electrical potential of the ground layer. In the high-frequency module 100 according to Embodiment 1, the conductive layer 106 constitutes a conductive member.

(1.3) Detailed Structure of High-Frequency Module

Next, the detailed structure of the high-frequency module 100 according to Embodiment 1 will be described with reference to FIG. 2.

In the high-frequency module 100 according to Embodiment 1, as illustrated in FIG. 2, the first power amplifier 1 and the second power amplifier 2 are mounted on the first main surface 101 of the mounting substrate 10. The first power amplifier 1 and the second power amplifier 2 are arranged in a second direction D2 (left-right direction in FIG. 2) intersecting the first direction D1 which is the thickness direction of the mounting substrate 10. In addition, in the high-frequency module 100 according to Embodiment 1, as illustrated in FIG. 2, the IC chip 27 including the controller 20 is mounted on the second main surface 102 of the mounting substrate 10. In plan view in the thickness direction D1 of the mounting substrate 10, the IC chip 27 overlaps neither the first power amplifier 1 nor the second power amplifier 2.

Furthermore, in the high-frequency module 100 according to Embodiment 1, as illustrated in FIG. 2, the plurality of (for example, four) terminals 87 is disposed on the second main surface 102 of the mounting substrate 10. Two terminals 87 of the four terminals 87 overlap the first power amplifier 1 in plan view in the thickness direction D1 of the mounting substrate 10. Further, remaining two terminals 87 of the four terminals 87 overlap the second power amplifier 2 in plan view in the thickness direction D1 of the mounting substrate 10. In the high-frequency module 100 according to Embodiment 1, the plurality of terminals 87 is heat dissipation terminals for dissipating the heat generated in the first power amplifier 1 or the second power amplifier 2 to the outside (for example, the above-described circuit board).

As illustrated in FIG. 2, the high-frequency module 100 according to Embodiment 1 further includes the plurality of (for example, four) via conductors 40. The plurality of via conductors 40 passes through the mounting substrate 10 in the thickness direction D1 of the mounting substrate 10. The plurality of via conductors 40 includes two first via conductors 40A and two second via conductors 40B. The two first via conductors 40A correspond to the first power amplifier 1, and are connected to the first power amplifier 1. The two second via conductors 40B correspond to the second power amplifier 2, and are connected to the second power amplifier 2.

Each of the two first via conductors 40A and the two second via conductors 40B includes a plurality of (for example, two) unit vias 401 and 402. Each of the unit vias 401 and 402 is, for example, a thermal via formed in a cylindrical shape. The plurality of unit vias 401 and 402 is stacked in the thickness direction D1 of the mounting substrate 10. More specifically, the plurality of unit vias 401 and 402 is stacked such that the unit via 401 is on a side of the first main surface 101 of the mounting substrate 10, and the unit via 402 is on a side of the second main surface 102 of the mounting substrate 10, in the thickness direction D1 of the mounting substrate 10. Each of the via conductors 40 is configured to connect the first power amplifier 1 or the second power amplifier 2 mounted on the first main surface 101 of the mounting substrate 10, and the terminal 87 disposed on the second main surface 102 of the mounting substrate 10 to each other, with the plurality of (for example, three) conductive patterns 50 stacked in the thickness direction D1 of the mounting substrate 10 interposed therebetween. Although each of the via conductors 40 has the two unit vias 401 and 402 in the high-frequency module 100 according to Embodiment 1, the number of unit vias is not limited to two, and each of the via conductors 40 may have a single unit via, or may have three or more unit vias.

One first via conductor of the plurality of first via conductors 40A is connected to the first drive stage amplification unit 111 (see FIG. 4A) of the first power amplifier 1. Another first via conductor of the plurality of first via conductors 40A is connected to the first final stage amplification unit 112 (see FIG. 4A) of the first power amplifier 1. More specifically, the first via conductor 40A, of the plurality of first via conductors 40A, connected to the first final stage amplification unit 112 is connected at least to the ground terminal 1123 among the input terminal 1121, the output terminal 1122, and the ground terminal 1123 included in the first final stage amplification unit 112. Thus, in the high-frequency module 100 according to Embodiment 1, the heat generated in the first drive stage amplification unit 111 and the heat generated in the first final stage amplification unit 112 can be dissipated to the outside (for example, the above-described circuit board) via the plurality of first via conductors 40A and the plurality of terminals 87.

One second via conductor of the plurality of second via conductors 40B is connected to the second drive stage amplification unit 211 (see FIG. 4B) of the second power amplifier 2. Another second via conductor of the plurality of second via conductors 40B is connected to the second final stage amplification unit 212 (see FIG. 4B) of the second power amplifier 2. More specifically, the second via conductor 40B, of the plurality of second via conductors 40B, connected to the second final stage amplification unit 212 is connected at least to the ground terminal 2123 among the input terminal 2121, the output terminal 2122, and the ground terminal 2123 included in the second final stage amplification unit 212. Thus, in the high-frequency module 100 according to Embodiment 1, the heat generated in the second drive stage amplification unit 211 and the heat generated in the second final stage amplification unit 212 can be dissipated to the outside (for example, the above-described circuit board) via the plurality of second via conductors 40B and the plurality of terminals 87.

In addition, in the high-frequency module 100 according to Embodiment 1, one unit via 401 of the second via conductor 40B, of the plurality of second via conductors 40B, connected to the second final stage amplification unit 212 extends in the second direction D2, and is connected to an inner peripheral surface 163 of the conductive layer 106. That is, one unit via 401 of the second via conductor 40B, of the plurality of second via conductors 40B, connected to the second final stage amplification unit 212 is in contact with the inner peripheral surface 163 of the conductive layer 106. Thus, the heat generated in the second power amplifier 2 can be dissipated outward via the unit via 401 and the conductive layer 106. Thus, according to the high-frequency module 100 according to Embodiment 1, as compared with a case where the heat generated in the first power amplifier 1 and the second power amplifier 2 is dissipated only by the terminal 87, it is possible to improve the heat dissipation properties of the power amplifiers.

In the high-frequency module 100 according to Embodiment 1, as described above, the second power amplifier 2 is of the power class higher than the power class of the first power amplifier 1. Thus, the second power amplifier 2 has a larger heat dissipation amount than a heat dissipation amount of the first power amplifier 1. In the high-frequency module 100 according to Embodiment 1, the second via conductor 40B connected to the second power amplifier 2 having a relatively large heat dissipation amount is brought into contact with the conductive layer 106, thus it is possible to efficiently dissipate the heat generated in the power amplifier.

In addition, in the high-frequency module 100 according to Embodiment 1, as described above, the second via conductor 40B connected to the second final stage amplification unit 212 out of the second drive stage amplification unit 211 and the second final stage amplification unit 212 constituting the second power amplifier 2 is brought into contact with the conductive layer 106. Here, the output power and the heat dissipation amount in the second final stage amplification unit 212 are larger than those in the second drive stage amplification unit 211. Thus, by bringing the second via conductor 40B connected to the second final stage amplification unit 212 into contact with the conductive layer 106, the heat generated in the power amplifier (second power amplifier 2) can be efficiently dissipated.

(2) Effect (2.1) High-Frequency Module

The high-frequency module 100 according to Embodiment 1 includes the mounting substrate 10, at least one power amplifier (the first power amplifier 1 and the second power amplifier 2), the electronic component (the IC chip 27), the resin layer 105, a conductive member (the conductive layer 106), and the plurality of via conductors 40. The mounting substrate 10 has the first main surface 101 and the second main surface 102 opposite to each other. The power amplifier is mounted on the first main surface 101 of the mounting substrate 10. The electronic component is mounted on the second main surface 102 of the mounting substrate 10. The resin layer 105 is disposed on the first main surface 101 of the mounting substrate 10, and covers at least a part of the power amplifier. The conductive member covers at least a part of the resin layer 105, and covers at least a part of the outer peripheral surface 103 of the mounting substrate 10. The plurality of via conductors 40 is connected to the power amplifier, and passes through the mounting substrate 10. At least one via conductor 40 of the plurality of via conductors 40 is in contact with the conductive member.

In the high-frequency module 100 according to Embodiment 1, as described above, at least one via conductor 40 is in contact with (the inner peripheral surface 163 of) the conductive layer 106. Thus, the heat generated in the power amplifier (second power amplifier 2) to which the via conductor 40 in contact with the conductive layer 106 is connected can be dissipated outward via the via conductor 40 and the conductive layer 106. As a result, the heat dissipation properties of the power amplifier can be improved, as compared with a case where the heat is dissipated only by the terminal 87. In addition, as compared to a case where a conductor layer (wiring layer) in the mounting substrate 10 is brought into contact with the conductive layer 106, an area in contact with the conductive layer 106 is increased, and it is possible to improve the contact reliability.

(2.2) Communication Device

The communication device 300 according to Embodiment 1 includes the above-described high-frequency module 100 and signal processing circuit 301. The signal processing circuit 301 is connected to the high-frequency module 100.

Since the communication device 300 according to Embodiment 1 includes the high-frequency module 100, it is possible to improve the heat dissipation properties of the power amplifier.

A plurality of electronic components constituting the signal processing circuit 301 may be mounted on, for example, the above-described circuit board, or may be mounted on a circuit board (second circuit board) different from a circuit board (first circuit board) on which the high-frequency module 100 is mounted.

(3) Modification (3.1) Modification 1

Figure 5:
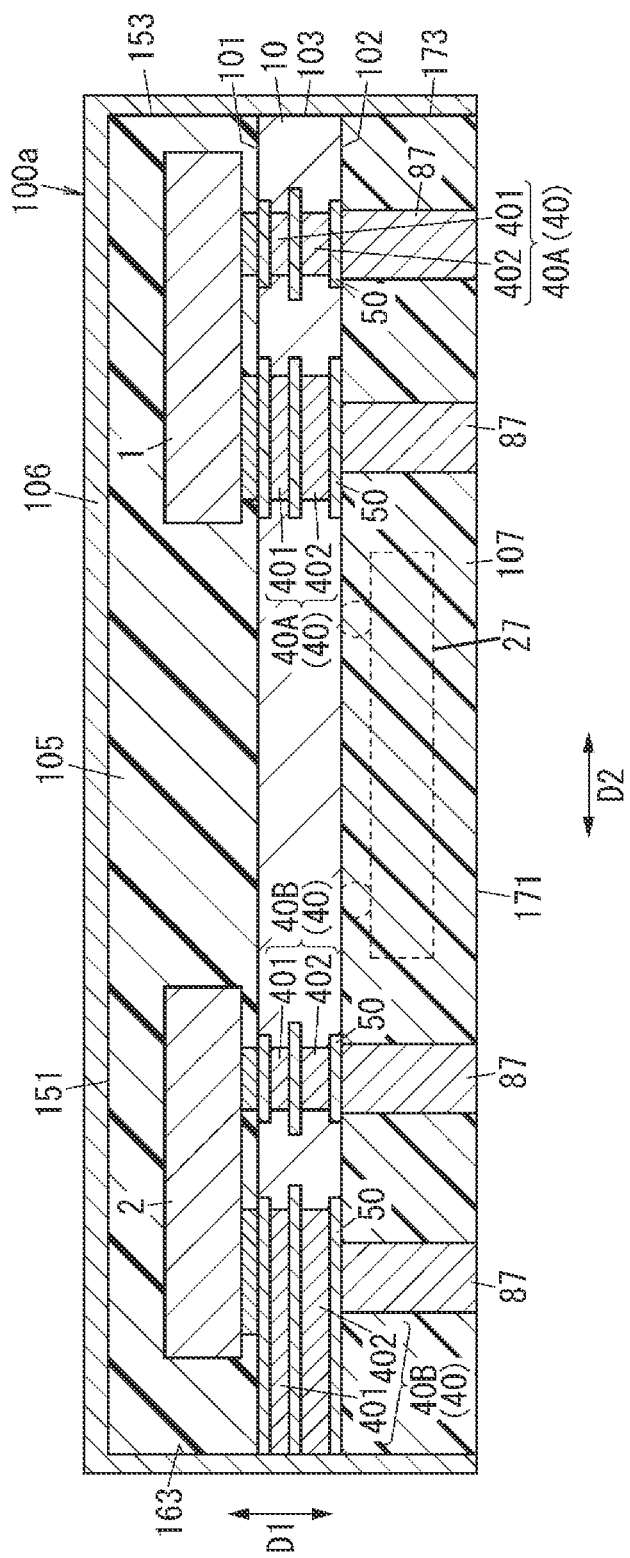
FIG. 5 is a sectional view of a high-frequency module according to Modification 1 of Embodiment 1.

A high-frequency module 100a according to Modification 1 of Embodiment 1 will be described with reference to FIG. 5. Regarding the high-frequency module 100a according to Modification 1, the same components as those of the high-frequency module 100 according to Embodiment 1 are denoted by the same symbols and description thereof is omitted. Note that a circuit configuration of the high-frequency module 100a is similar to the circuit configuration of the high-frequency module 100 according to Embodiment 1 described with reference to FIG. 3, FIG. 4A, and FIG. 4B.

The high-frequency module 100a according to Modification 1 is different from the high-frequency module 100 according to Embodiment 1 in that both the two unit vias 401 and 402 of one second via conductor 40B of the plurality of second via conductors 40B connected to the second power amplifier 2 are in contact with the conductive layer 106.

In the high-frequency module 100a according to Modification 1, one second via conductor 40B (on a left side in FIG. 5) of the plurality of second via conductors 40B connected to the second power amplifier 2 is connected to the second final stage amplification unit 212 (see FIG. 4B).

In this second via conductor 40B, both the two unit vias 401 and 402 are brought into contact with the inner peripheral surface 163 of the conductive layer 106, and a contact area with the conductive layer 106 is large. Thus, the heat dissipation properties of the power amplifier (second power amplifier 2) can be improved, as compared with the case where only one unit via 401 is brought into contact with the conductive layer 106. That is, according to the high-frequency module 100*a* of Modification 1, it is possible to further improve the heat dissipation properties of the power amplifier.

(3.2) Modification 2

Figure 6:
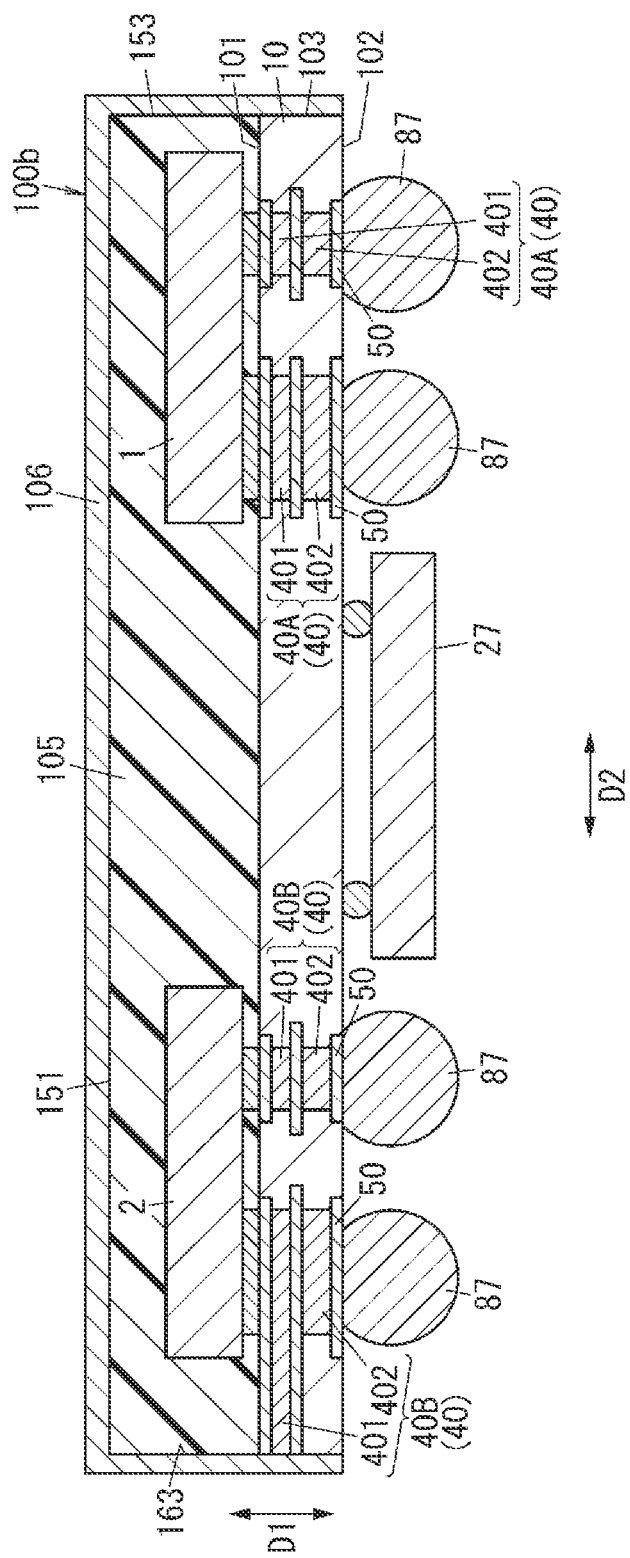
FIG. 6 is a sectional view of a high-frequency module according to Modification 2 of Embodiment 1.

A high-frequency module 100*b* according to Modification 2 of Embodiment 1 will be described with reference to FIG. 6. Regarding the high-frequency module 100*b* according to Modification 2, the same components as those of the high-frequency module 100 according to Embodiment 1 are denoted by the same symbols and description thereof is omitted. Note that a circuit configuration of the high-frequency module 100*b* is similar to the circuit configuration of the high-frequency module 100 according to Embodiment 1 described with reference to FIG. 3, FIG. 4A, and FIG. 4B.

The high-frequency module 100*b* according to Modification 2 is different from the high-frequency module 100 according to Embodiment 1 in that the plurality of terminals 87 is ball bumps. Further, the high-frequency module 100*b* according to Modification 2 is different from the high-frequency module 100 according to Embodiment 1 in that the second resin layer 107 of the high-frequency module 100 according to Embodiment 1 is not included. The high-frequency module 100*b* according to Modification 2 may include an underfill portion provided in a gap between the second-group circuit components (for example, the IC chip 27) mounted on the second main surface 102 of the mounting substrate 10 and the second main surface 102 of the mounting substrate 10.

A material of the ball bump constituting each of the terminals 87 is, for example, gold, copper, solder, or the like.

The plurality of terminals 87 may include both the terminal 87 configured with a ball bump and the terminal 87 formed in a cylindrical shape.

Embodiment 2

Figure 7:
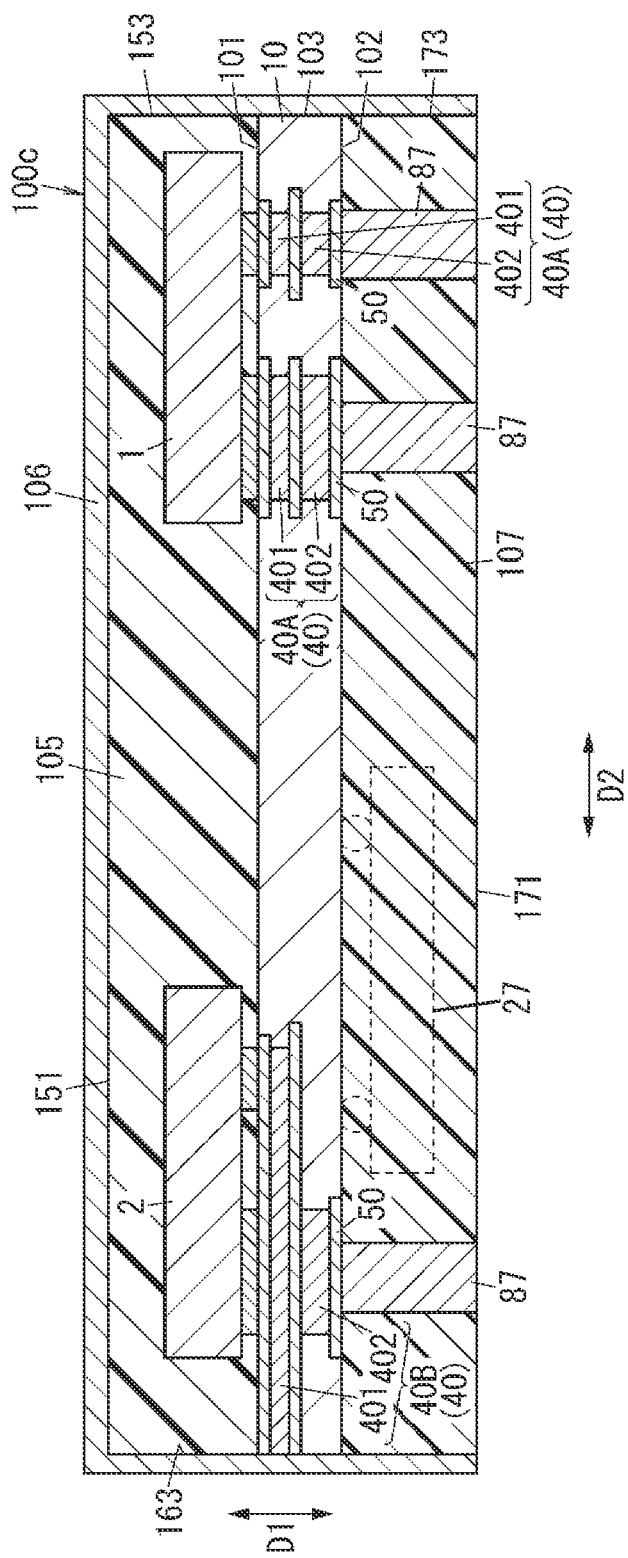
FIG. 7 is a sectional view of a high-frequency module according to Embodiment 2.

A high-frequency module 100*c* according to Embodiment 2 will be described with reference to FIG. 7. Regarding the high-frequency module 100*c* according to Embodiment 2, the same components as those of the high-frequency module 100 according to Embodiment 1 are denoted by the same symbols and description thereof is omitted. Note that a circuit configuration of the high-frequency module 100*c* is similar to the circuit configuration of the high-frequency module 100 according to Embodiment 1 described with reference to FIG. 3, FIG. 4A, and FIG. 4B.

(1) Configuration of High-Frequency Module

The high-frequency module 100*c* according to Embodiment 2 is different from the high-frequency module 100 according to Embodiment 1 in that the second drive stage amplification unit 211 and the second final stage amplification unit 212 (see FIG. 4B) constituting the second power amplifier 2 are connected, by one second via conductor 40B, to the terminal 87 and the conductive layer 106. That is, in the high-frequency module 100*c* according to Embodiment 2, both the second drive stage amplification unit 211 and the second final stage amplification unit 212 are connected to the inner peripheral surface 163 of the conductive layer 106 with the second via conductor 40B interposed therebetween.

The high-frequency module 100*c* according to Embodiment 2 includes the plurality of via conductors 40. The plurality of via conductors 40 includes two first via conductors 40A and one second via conductor 40B.

One first via conductor 40A of the two first via conductors 40A is connected to the first drive stage amplification unit 111 (see FIG. 4A) of the first power amplifier 1. Another first via conductor 40A of the two first via conductors 40A is connected to the first final stage amplification unit 112 (see FIG. 4A) of the first power amplifier 1. Each of the two first via conductors 40A has a plurality of (for example, two) unit vias 401 and 402 stacked in the thickness direction D1 of the mounting substrate 10. In the first power amplifier 1, each of the first drive stage amplification unit 111 and the first final stage amplification unit 112 is connected to the terminal 87 with the first via conductor 40A interposed therebetween, and the heat generated in the first power amplifier 1 can be dissipated to the outside (for example, a circuit board on which the high-frequency module 100*c* is mounted) via the terminal 87.

The one second via conductor 40B is connected to both the second drive stage amplification unit 211 and the second final stage amplification unit 212 (see FIG. 4B) of the second power amplifier 2. The one second via conductor 40B has a plurality of (for example, two) unit vias 401 and 402 stacked in the thickness direction D1 of the mounting substrate 10. One unit via 401 of the plurality of unit vias 401 and 402 extends in the second direction D2 so as to be connectable to both the second drive stage amplification unit 211 and the second final stage amplification unit 212 of the second power amplifier 2. The second direction D2 (left-right direction in FIG. 7) intersects the first direction D1, which is the thickness direction of the mounting substrate 10. Further, the unit via 401 is in contact with the inner peripheral surface 163 of the conductive layer 106 at one end portion (left end portion in FIG. 7) in the second direction D2. Thus, the heat generated in the second drive stage amplification unit 211 and the second final stage amplification unit 212 can be dissipated outward via the unit via 401 and the conductive layer 106. As a result, the heat dissipation properties of the power amplifier (second power amplifier 2) can be improved, as compared with a case where the heat is dissipated only by the terminal 87.

In addition, in the high-frequency module 100*c* according to Embodiment 2, as described above, both the second drive stage amplification unit 211 and the second final stage amplification unit 212 of the second power amplifier 2 can be connected to the conductive layer 106 by the one second via conductor 40B. Thus, it is possible to omit one terminal 87 to be disposed below the second power amplifier 2 in the thickness direction D1 of the mounting substrate 10. As a result, as illustrated in FIG. 7, the IC chip 27 mounted on the second main surface 102 of the mounting substrate 10 can be disposed on a side of the second power amplifier 2 so as to overlap the second power amplifier 2 in the thickness direction D1 of the mounting substrate 10. That is, according to the high-frequency module 100*c* according to Embodiment 2, it is possible to improve a degree of freedom in the disposition of the electronic component on the second main surface 102 of the mounting substrate 10.

In the high-frequency module 100*c* according to Embodiment 2, the second power amplifier 2 and the IC chip 27 overlap each other in plan view in the thickness direction D1 of the mounting substrate 10. In the example of FIG. 7, a part of the second power amplifier 2 and a part of the IC chip 27 overlap each other in plan view in the thickness direction D1 of the mounting substrate 10, but the configuration is not limited thereto. For example, in plan view in the thickness direction D1 of the mounting substrate 10, an entirety of the second power amplifier 2 and a part of the IC chip 27 may overlap each other, a part of the second power amplifier 2 and an entirety of the IC chip 27 may overlap each other, or the entire second power amplifier 2 and the entire IC chip 27 may overlap each other. In short, "the second power amplifier 2 and the IC chip 27 overlap each other in plan view in the thickness direction D1 of the mounting substrate 10" means that at least a part of the second power amplifier 2 and at least a part of the IC chip 27 overlap each other in plan view in the thickness direction D1 of the mounting substrate 10. This makes it possible to reduce an area of the mounting substrate 10 in plan view in the thickness direction D1 of the mounting substrate 10. In addition, it is possible to shorten a path between the second power amplifier 2 and the IC chip 27 in the thickness direction D1 of the mounting substrate 10.

(2) Modifications (2.1) Modification 1

A high-frequency module 100d according to Modification 1 of Embodiment 2 will be described with reference to FIG. 8. Regarding the high-frequency module 100d according to Modification 1, the same components as those of the high-frequency module 100c according to Embodiment 2 are denoted by the same symbols and description thereof is omitted. Note that a circuit configuration of the high-frequency module 100d is similar to the circuit configuration of the high-frequency module 100 according to Embodiment 1 described with reference to FIG. 3, FIG. 4A, and FIG. 4B.

The high-frequency module 100d according to Modification 1 is different from the high-frequency module 100c according to Embodiment 2 in that the controller 20 and the low-noise amplifier 9 are mounted side by side in the second direction D2 on the second main surface 102 of the mounting substrate 10.

Figure 8:
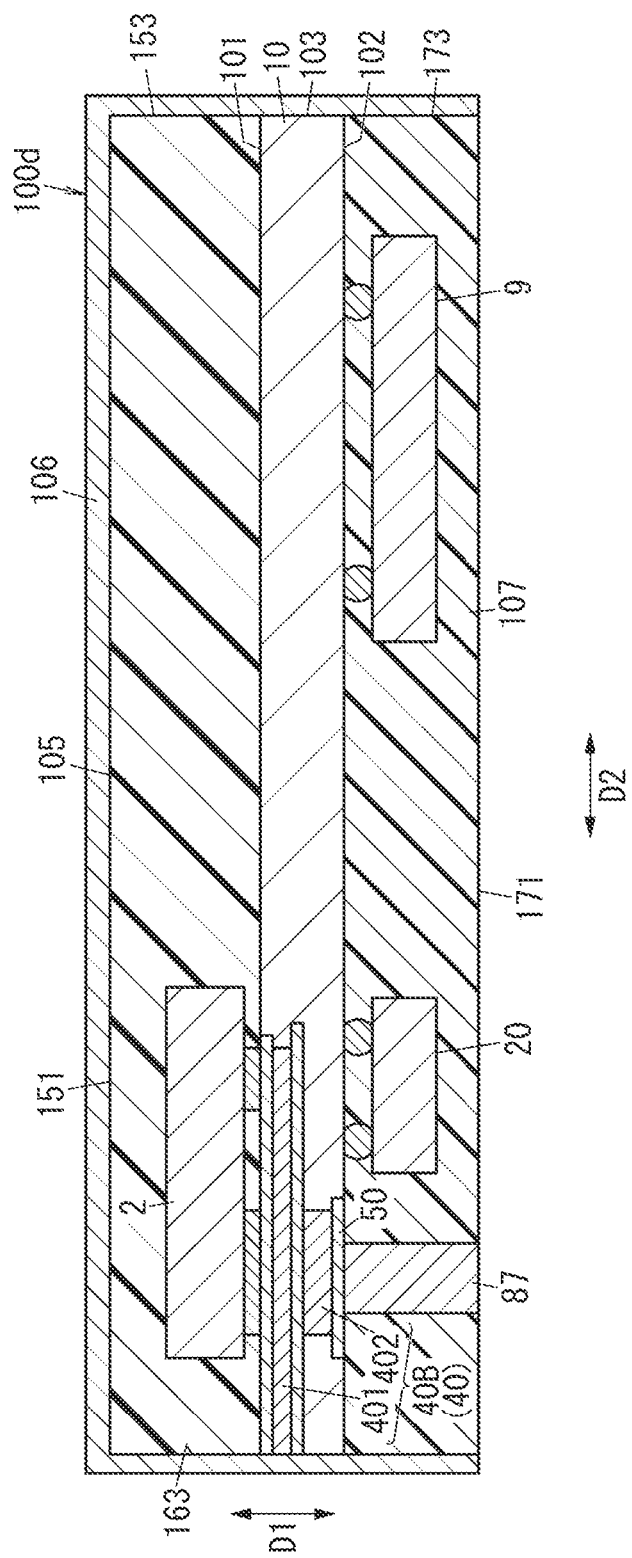
FIG. 8 is a sectional view of a high-frequency module according to Modification 1 of Embodiment 2.

In the high-frequency module 100d according to Modification 1, as illustrated in FIG. 8, the second power amplifier 2 is mounted on the first main surface 101 of the mounting substrate 10. The second power amplifier 2 is connected to the terminal 87 with one second via conductor 40B interposed therebetween. In addition, in the second power amplifier 2, one unit via 401 of two unit vias 401 and 402 of the second via conductor 40B extends in the second direction D2, and is in contact with the inner peripheral surface 163 of the conductive layer 106. The second direction D2 (left-right direction in FIG. 8) intersects the first direction D1, which is the thickness direction of the mounting substrate 10.

The controller 20 and the low-noise amplifier 9 are mounted on the second main surface 102 of the mounting substrate 10. The controller 20 and the low-noise amplifier 9 are arranged in the second direction D2. In the high-frequency module 100d according to Modification 1, a part of the second power amplifier 2 and an entirety of the controller 20 overlap each other in the thickness direction D1 of the mounting substrate 10. This makes it possible to reduce an area of the mounting substrate 10 in plan view in the thickness direction D1 of the mounting substrate 10. In addition, it is possible to shorten a path between the second power amplifier 2 and the controller 20 in the thickness direction D1 of the mounting substrate 10.

On the other hand, in the high-frequency module 100d according to Modification 1, the low-noise amplifier 9 does not overlap the second power amplifier 2 in the thickness direction D1 of the mounting substrate 10.

In the high-frequency module 100d according to Modification 1, a part of the second power amplifier 2 and the entirety of the controller 20 overlap each other in the thickness direction D1 of the mounting substrate 10, but the configuration is not limited thereto. For example, in the thickness direction D1 of the mounting substrate 10, an entirety of the second power amplifier 2 and the entirety of the controller 20 may overlap each other, the entire second power amplifier 2 and a part of the controller 20 may overlap each other, or a part of the second power amplifier 2 and a part of the controller 20 may overlap each other. In short, "the second power amplifier 2 and the controller 20 overlap each other in plan view in the thickness direction D1 of the mounting substrate 10" means that at least a part of the second power amplifier 2 and at least a part of the controller 20 overlap each other in plan view in the thickness direction D1 of the mounting substrate 10.

(2.2) Modification 2

Figure 9:
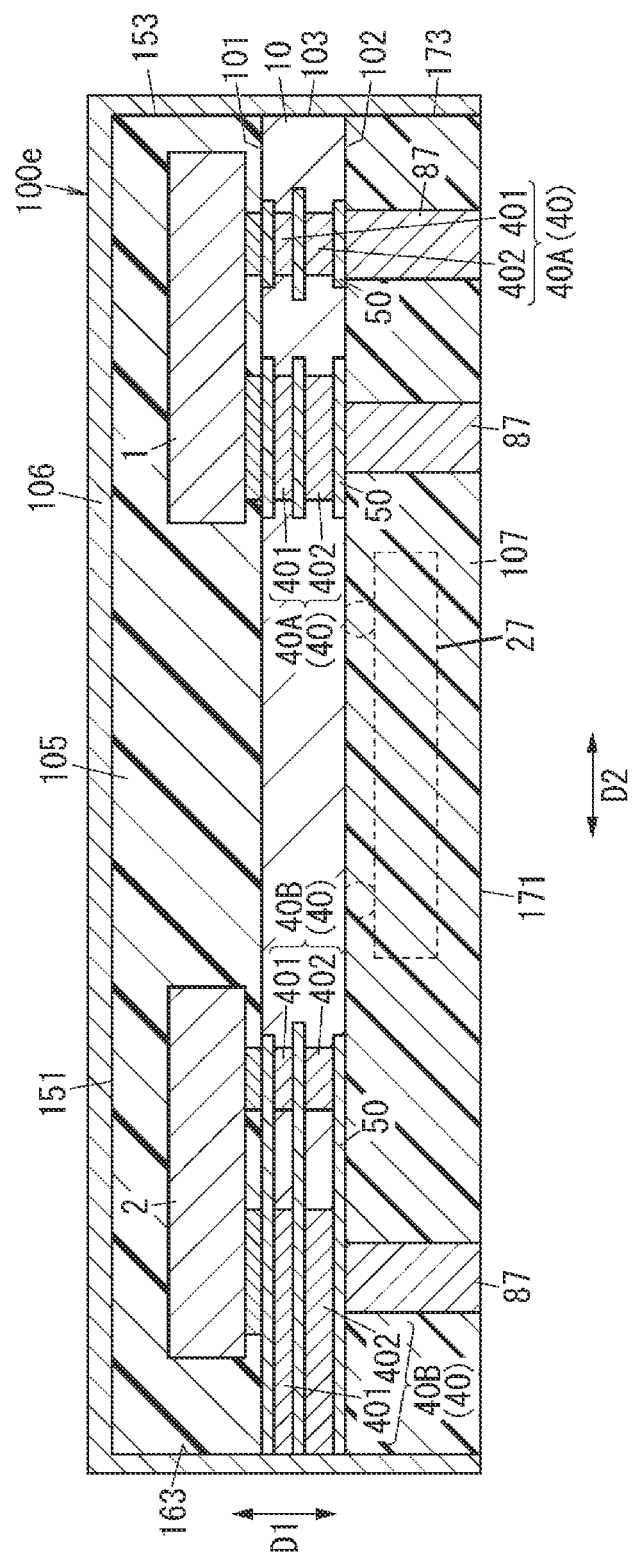
FIG. 9 is a sectional view of a high-frequency module according to Modification 2 of Embodiment 2.

A high-frequency module 100e according to Modification 2 of Embodiment 2 will be described with reference to FIG. 9. Regarding the high-frequency module 100e according to Modification 2, the same components as those of the high-frequency module 100c according to Embodiment 2 are denoted by the same symbols and description thereof is omitted. Note that a circuit configuration of the high-frequency module 100e is similar to the circuit configuration of the high-frequency module 100 according to Embodiment 1 described with reference to FIG. 3, FIG. 4A, and FIG. 4B.

The high-frequency module 100e according to Modification 2 is different from the high-frequency module 100c according to Embodiment 2 in that both unit vias of a plurality of the unit vias 401 and 402 in each of the two second via conductors 40B connected to the second power amplifier 2 are in contact with the conductive layer 106 and the terminal 87.

In the high-frequency module 100e according to Modification 2, one second via conductor 40B of the two second via conductors 40B is connected to the second drive stage amplification unit 211 (see FIG. 4B) of the second power amplifier 2. Another second via conductor 40B of the two second via conductors 40B is connected to the second final stage amplification unit 212 (see FIG. 4B) of the second power amplifier 2. Each of the two second via conductors 40B includes the plurality of (for example, two) unit vias 401 and 402 stacked in the thickness direction D1 of the mounting substrate 10. The unit vias 401 and 402 of the second via conductor 40B connected to the second final stage amplification unit 212 of the second power amplifier 2 extend in the second direction D2 (left-right direction in FIG. 9) which intersects the first direction D1 which is the thickness direction of the mounting substrate 10, and are in contact with the inner peripheral surface 163 of the conductive layer 106. Further, the unit vias 401 and 402 of the second via conductor 40B connected to the second drive stage amplification unit 211 of the second power amplifier 2 are connected to the unit vias 401 and 402 of the second via conductor 40B connected to the second final stage amplification unit 212 with the plurality of conductive patterns 50 interposed therebetween. Thus, the heat generated in the second drive stage amplification unit 211 and the second final stage amplification unit 212 can be dissipated outward via the unit vias 401 and 402 and the conductive layer 106. As a result, the heat dissipation properties of the power amplifier (second power amplifier 2) can be improved, as compared with a case where the heat is dissipated only by the terminal 87.

In addition, in the high-frequency module 100e according to Modification 2, the two second via conductors 40B are connected to one terminal 87. Thus, as compared with a case where the two second via conductors 40B are connected to different terminals 87, it is possible to ensure a space for disposing electronic components below the second power amplifier 2. As a result, it is possible to improve a degree of freedom in the disposition of electronic components on the second main surface 102 of the mounting substrate 10.

In addition, when the IC chip 27 mounted on the second main surface 102 of the mounting substrate 10 is disposed on a side of the second power amplifier 2 so as to overlap the second power amplifier 2 in plan view in the thickness direction D1 of the mounting substrate 10, it is possible to reduce an area of the mounting substrate 10 in plan view in the thickness direction D1 of the mounting substrate 10. Further, it is possible to shorten the path between the second power amplifier 2 and the IC chip 27 in the thickness direction D1 of the mounting substrate 10.

Embodiment 3

Figure 10:
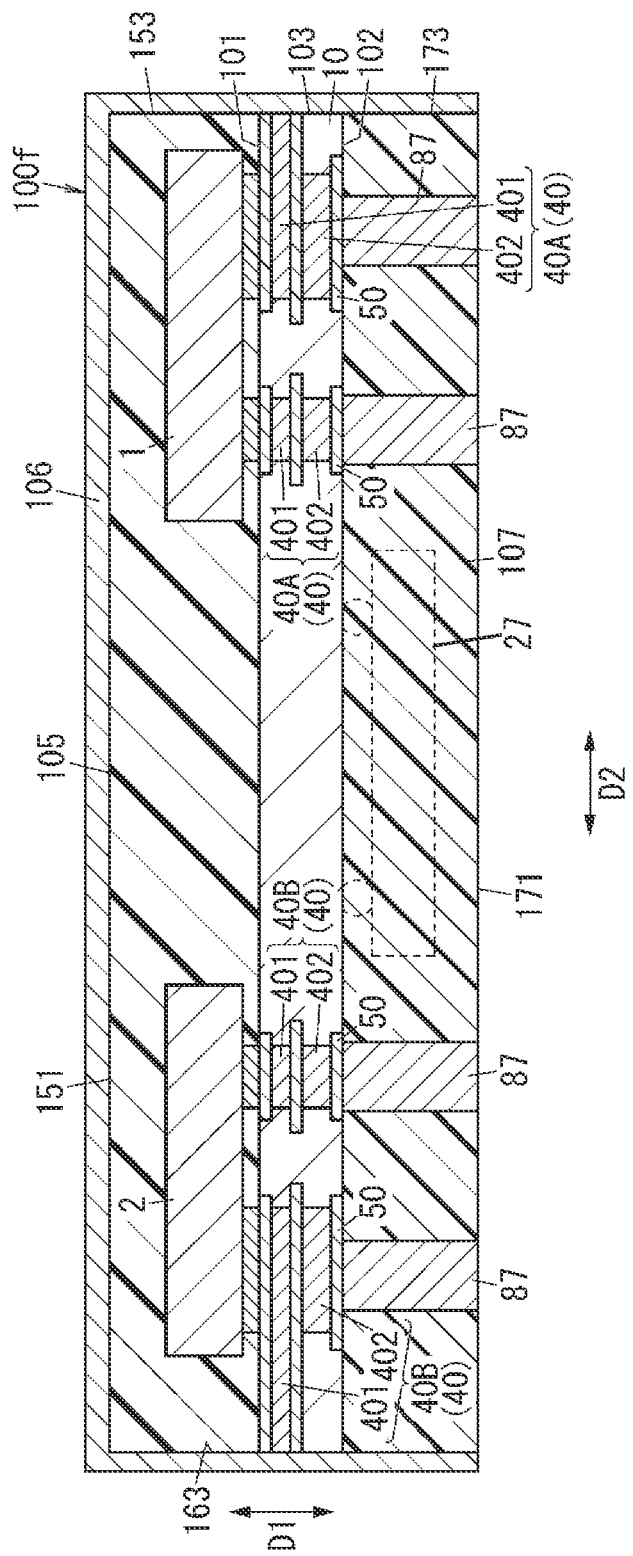
FIG. 10 is a sectional view of a high-frequency module according to Embodiment 3.

A high-frequency module 100f according to Embodiment 3 will be described with reference to FIG. 10. Regarding the high-frequency module 100f according to Embodiment 3, the same components as those of the high-frequency module 100 according to Embodiment 1 are denoted by the same symbols and description thereof is omitted. Note that a circuit configuration of the high-frequency module 100f is similar to the circuit configuration of the high-frequency module 100 according to Embodiment 1 described with reference to FIG. 3, FIG. 4A, and FIG. 4B.

The high-frequency module 100f according to Embodiment 3 is different from the high-frequency module 100 according to Embodiment 1 in that both the first final stage amplification unit 112 of the first power amplifier 1 and the second final stage amplification unit 212 of the second power amplifier 2 are brought into contact with the conductive layer 106 with the via conductors 40 interposed therebetween.

In the high-frequency module 100f according to Embodiment 3, the first power amplifier 1 and the second power amplifier 2 are mounted on the first main surface 101 of the mounting substrate 10 in the second direction D2 (left-right direction in FIG. 10) intersecting the first direction D1 which is the thickness direction of the mounting substrate 10.

The high-frequency module 100f according to Embodiment 3 includes a plurality of (for example, four) via conductors 40. The plurality of via conductors 40 includes two first via conductors 40A and two second via conductors 40B.

One first via conductor 40A of the two first via conductors 40A is connected to the first drive stage amplification unit 111 of the first power amplifier 1. Another first via conductor 40A of the two first via conductors 40A is connected to the first final stage amplification unit 112 of the first power amplifier 1. The two first via conductors 40A each include a plurality of (for example, two) unit vias 401 and 402. In the high-frequency module 100f according to Embodiment 3, one unit via 401 of the first via conductor 40A connected to the first final stage amplification unit 112 of the first power amplifier 1 extends in the second direction D2 (left-right direction in FIG. 10), and is in contact with the inner peripheral surface 163 of the conductive layer 106. That is, the first via conductor 40A is in contact with the inner peripheral surface 163 of the conductive layer 106 at a portion on an opposite side from a side of the second power amplifier 2 in the second direction D2. Accordingly, the heat generated in the first final stage amplification unit 112 of the first power amplifier 1 can be dissipated to the outside (for example, a circuit board on which the high-frequency module 100f is mounted) via the unit via 401 of the first via conductor 40A and the conductive layer 106.

One second via conductor 40B of the two second via conductors 40B is connected to the second drive stage amplification unit 211 of the second power amplifier 2. Another second via conductor 40B of the two second via conductors 40B is connected to the second final stage amplification unit 212 of the second power amplifier 2. The two second via conductors 40B each include a plurality of (for example, two) unit vias 401 and 402. In the high-frequency module 100f according to Embodiment 3, one unit via 401 of the second via conductor 40B connected to the second final stage amplification unit 212 of the second power amplifier 2 extends in the second direction D2 (left-right direction in FIG. 10), and is in contact with the inner peripheral surface 163 of the conductive layer 106. That is, the second via conductor 40B is in contact with the inner peripheral surface 163 of the conductive layer 106 at a portion on an opposite side from a side of the first power amplifier 1 in the second direction D2. Thus, the heat generated in the second final stage amplification unit 212 of the second power amplifier 2 can be dissipated outward via the unit via 401 of the second via conductor 40B and the conductive layer 106.

According to the high-frequency module 100f of Embodiment 3, both the heat generated in the first power amplifier 1 and the heat generated in the second power amplifier 2 can be dissipated outward via the conductive layer 106. That is, according to the high-frequency module 100f according to Embodiment 3, it is possible to further improve the heat dissipation properties of the power amplifier as compared with the high-frequency module 100 of Embodiment 1.

Embodiment 4

Figure 11:
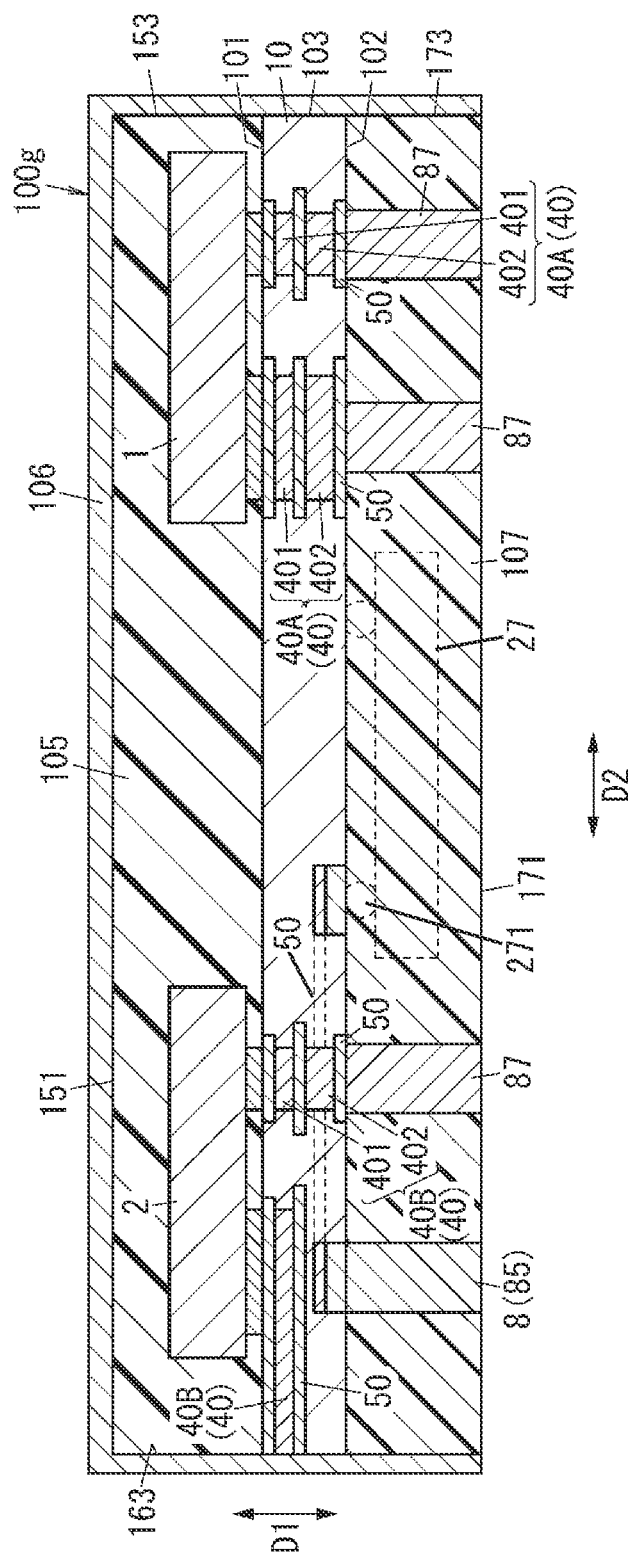
FIG. 11 is a sectional view of a high-frequency module according to Embodiment 4.

A high-frequency module 100g according to Embodiment 4 will be described with reference to FIG. 11. Regarding the high-frequency module 100g according to Embodiment 4, the same components as those of the high-frequency module 100 according to Embodiment 1 are denoted by the same symbols and description thereof is omitted. Note that a circuit configuration of the high-frequency module 100g is similar to the circuit configuration of the high-frequency module 100 according to Embodiment 1 described with reference to FIG. 3, FIG. 4A, and FIG. 4B.

The high-frequency module 100g according to Embodiment 4 is different from the high-frequency module 100 according to Embodiment 1 in that the external connection terminal 8 to which a signal terminal 271 of the IC chip 27 is connected is provided instead of the terminal 87 for dissipating the heat generated in the second final stage amplification unit 212 of the second power amplifier 2.

In the high-frequency module 100g according to Embodiment 4, the external connection terminal 8 is further disposed on the second main surface 102 of the mounting substrate 10. The external connection terminal 8 overlaps the second power amplifier 2 in the thickness direction D1 of the mounting substrate 10. In the high-frequency module 100g according to Embodiment 4, the external connection terminal 8 is the control terminal 85 connected to the controller 20 included in the IC chip 27. That is, the signal terminal 271 of the IC chip 27 is a terminal connected to the control terminal 85 as the external connection terminal 8. The signal terminal 271 is connected to the external connection terminal 8 (control terminal 85) with the conductive pattern 50 provided in the mounting substrate 10 interposed therebetween.

In the high-frequency module 100g according to Embodiment 4, the second via conductor 40B connected to the second final stage amplification unit 212 of the second power amplifier 2 has one unit via 401. The one unit via 401 extends in the second direction D2 (left-right direction in FIG. 11) intersecting the first direction D1, which is the thickness direction of the mounting substrate 10, and is in contact with the inner peripheral surface 163 of the conductive layer 106. Accordingly, the heat generated in the second final stage amplification unit 212 of the second power amplifier 2 can be dissipated to the outside (for example, a circuit board on which the high-frequency module 100g is mounted) via the unit via 401 and the conductive layer 106.

On the other hand, the second drive stage amplification unit 211 of the second power amplifier 2 is connected to the terminal 87 with a plurality of (for example, two) unit vias 401 and 402 interposed therebetween. Thus, the heat generated in the second drive stage amplification unit 211 of the second power amplifier 2 can be dissipated outward via the second via conductor 40B and the terminal 87.

In addition, in the high-frequency module 100g according to Embodiment 4, each of the first drive stage amplification unit 111 and the first final stage amplification unit 112 of the first power amplifier 1 is connected to the terminal 87 with the first via conductor 40A interposed therebetween. The first via conductor 40A has a plurality of (for example, two) unit vias 401 and 402 stacked in the thickness direction D1 of the mounting substrate 10. In the high-frequency module 100g according to Embodiment 4, the heat generated in the first drive stage amplification unit 111 and the first final stage amplification unit 112 of the first power amplifier 1 can be dissipated outward via the first via conductors 40A and the terminals 87.

According to the high-frequency module 100g according to Embodiment 4, as described above, the heat generated in the first power amplifier 1 can be dissipated outward via the first via conductors 40A and the terminals 87. In addition, according to the high-frequency module 100g according to Embodiment 4, as described above, the heat generated in the second drive stage amplification unit 211 of the second power amplifier 2 can be dissipated outward via the second via conductor 40B and the terminal 87, and the heat generated in the second final stage amplification unit 212 of the second power amplifier 2 can be dissipated outward via the second via conductor 40B and the conductive layer 106. As described above, according to the high-frequency module 100g according to Embodiment 4, it is possible to improve the heat dissipation properties of the power amplifier.

In addition, in the high-frequency module 100g according to Embodiment 4, as described above, the heat generated in the second final stage amplification unit 212 of the second power amplifier 2 can be dissipated to the conductive layer 106 via the second via conductor 40B, and a space for disposing the external connection terminal 8 can be ensured below the second power amplifier 2. Accordingly, it is possible to improve a degree of freedom in the disposition of the electronic component and the like on the second main surface 102 of the mounting substrate 10.

(Other Modifications)

Each of the above-described Embodiments 1 to 4 and the like is merely one of various embodiments of the present disclosure. The above-described Embodiments 1 to 4 and the like can be variously modified in accordance with design or the like as long as the possible benefit of the present disclosure can be achieved, and different components of different embodiments may be appropriately combined.

In the high-frequency modules 100, 100a, 100b, 100c, 100d, 100e, 100f, and 100g, the conductive layer 106 is not limited to covering the entire main surface 151 of the first resin layer 105, but may cover at least a part of the main surface 151 of the first resin layer 105.

The conductive member is not limited to the conductive layer 106, and may be, for example, a metal cap. The metal cap has a rectangular plate-shaped ceiling wall portion located away from the first main surface 101 of the mounting substrate 10 in the thickness direction D1 of the mounting substrate 10, and an outer peripheral wall portion surrounding the outer peripheral surface 103 of the mounting substrate 10 and surrounding circuit components such as the first power amplifier 1 mounted on the first main surface 101 of the mounting substrate 10. The metal cap is connected to a ground layer of the mounting substrate 10 on the outer peripheral surface 103 of the mounting substrate 10.

Further, each of the transmission filters 41 and 51 and the reception filters 42 and 52 is not limited to a surface acoustic wave filter, and may be, for example, a bulk acoustic wave (BAW) filter. A resonator in the BAW filter is, for example, a Film Bulk Acoustic Resonator (FBAR) or a Solidly Mounted Resonator (SMR). The BAW filter has a substrate. The substrate is, for example, a silicon substrate.

Further, each of the transmission filters 41 and 51 and the reception filters 42 and 52 is not limited to a ladder-type filter, and may be, for example, a longitudinally coupled resonator-type surface acoustic wave filter.

Further, the above-described acoustic wave filter is an acoustic wave filter in which a surface acoustic wave or a bulk acoustic wave is utilized, but the acoustic wave filter is not limited thereto, and for example, may be an acoustic wave filter in which a boundary acoustic wave, a plate wave, or the like is utilized.

Figure 3:
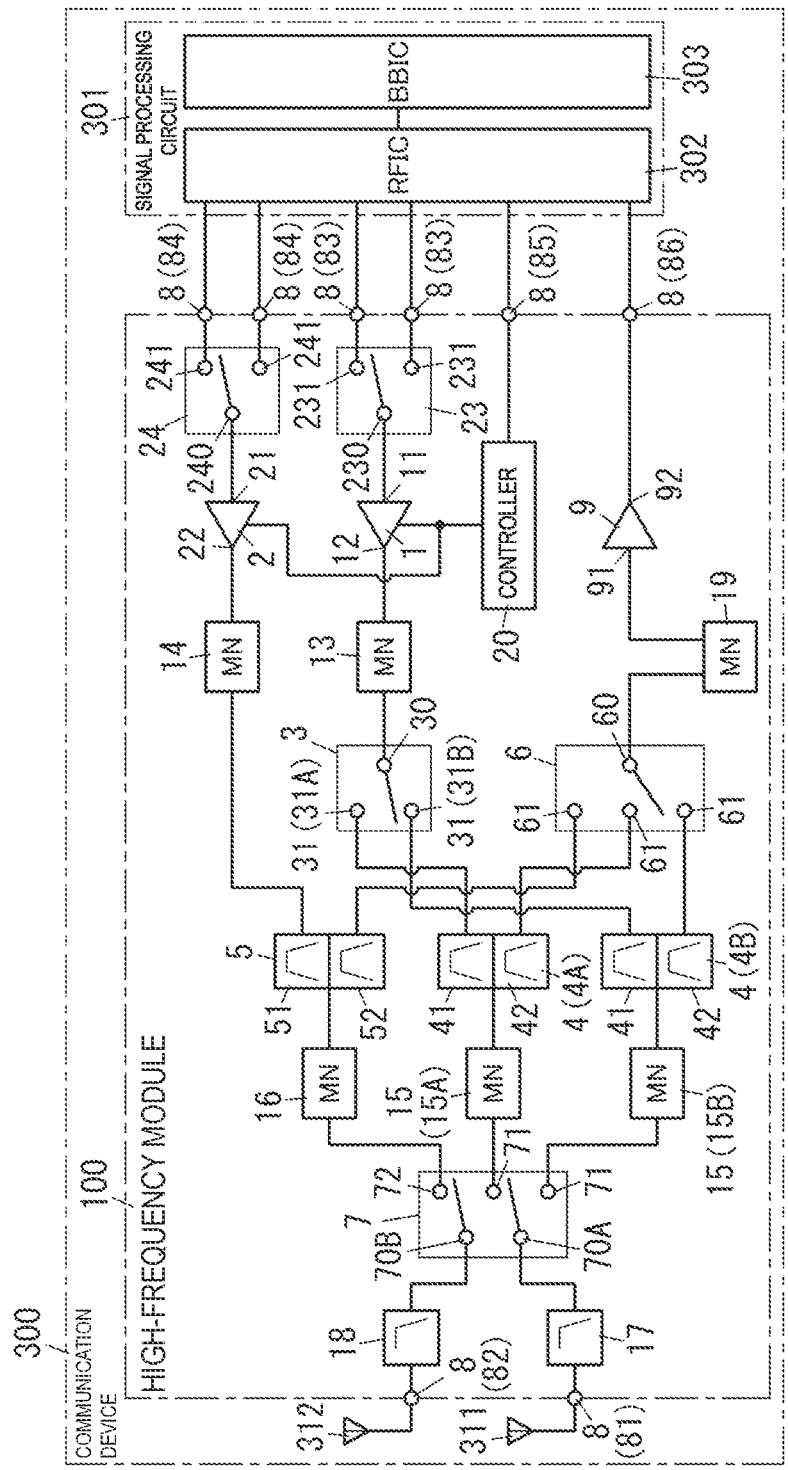
FIG. 3 is a circuit configuration diagram of a communication device including the high-frequency module according to Embodiment 1.

The circuit configurations of the high-frequency modules 100 to 100g are not limited to the example of FIG. 3 described above. Further, the high-frequency modules 100 to 100g may each include, for example, a high-frequency front-end circuit supporting Multi Input Multi Output (MIMO), as a circuit configuration.

Further, the communication device 300 according to Embodiment 1 may include any one of the high-frequency modules 100a, 100b, 100c, 100d, 100e, 100f, and 100g, instead of the high-frequency module 100.

The electronic component is not limited to the IC chip 27 including the controller 20, and may be another electronic component as long as the electronic component is mounted on the second main surface 102 of the mounting substrate 10. For example, an electronic component may be the low-noise amplifier 9 mounted on the second main surface 102 of the mounting substrate 10.

(Aspects)

The following aspects are disclosed in the present specification.

A high-frequency module (100; 100a to 100g) according to a first aspect includes a mounting substrate (10), at least one power amplifier (1, 2), an electronic component (27), a conductive member (106), and a plurality of via conductors (40). The mounting substrate (10) has a first main surface (101) and a second main surface (102) opposite to each other. The power amplifier (1, 2) is mounted on the first main surface (101) of the mounting substrate (10). The electronic component (27) is mounted on the second main surface (102) of the mounting substrate (10). A resin layer (105) is disposed on the first main surface (101) of the mounting substrate (10), and covers at least a part of the power amplifier (1, 2). The conductive member (106) covers at least a part of the resin layer (105), and covers at least a part of an outer peripheral surface (103) of the mounting substrate 10. The plurality of via conductors (40) is connected to the power amplifier (1, 2), and passes through the mounting substrate (10). At least one via conductor (40) of the plurality of via conductors (40) is in contact with the conductive member (106).

According to this aspect, it is possible to improve the heat dissipation properties of the power amplifier (1, 2).

The high-frequency module (100; 100a to 100g) according to a second aspect is the first aspect further including a terminal (87). The terminal (87) is disposed on the second main surface (102) of the mounting substrate (10). The via conductor (40) is connected to the terminal (87).

According to this aspect, it is possible to improve the heat dissipation properties of the power amplifier (1, 2).

In the high-frequency module (100c) according to a third aspect, the electronic component (27) is an IC chip (27) in the first or second aspect. The power amplifier (2) and the IC chip (27) overlap each other in plan view in a thickness direction (D1) of the mounting substrate (10).

According to this aspect, it is possible to shorten a path between the power amplifier (2) and the IC chip (27).

In the high-frequency module (100c) according to a fourth aspect, the IC chip (27) includes a controller (20) configured to control the power amplifier (2) in the third aspect.

According to this aspect, it is possible to shorten a path between the power amplifier (2) and the controller (20).

In the high-frequency module (100; 100a to 100g) according to a fifth aspect, the power amplifier (1, 2) includes a drive stage amplification unit (111, 211) and a final stage amplification unit (112, 212) in any one of the first to fourth aspects. The drive stage amplification unit (111, 211) amplifies and outputs a high-frequency signal. The final stage amplification unit (112, 212) amplifies and outputs the high-frequency signal outputted from the drive stage amplification unit (111, 211). The via conductor (40) is connected to the final stage amplification unit (112, 212).

According to this aspect, it is possible to improve the heat dissipation properties of the final stage amplification unit (112, 212).

In the high-frequency module (100; 100a to 100g) according to a sixth aspect, the via conductor (40) is further connected to the drive stage amplification unit (111, 211) in the fifth aspect.

According to this aspect, it is also possible to improve the heat dissipation properties of the drive stage amplification unit (111, 211).

In the high-frequency module (100; 100a to 100g) according to a seventh aspect, the final stage amplification unit (112, 212) has an input terminal (1121, 2121), an output terminal (1122, 2122), and a ground terminal (1123, 2123) in the fifth or sixth aspect. The via conductor (40) is connected at least to the ground terminal (1123, 2123).

In the high-frequency module (100; 100a to 100g) according to an eighth aspect, each of the plurality of via conductors (40) has two or more unit vias (401, 402) stacked in a thickness direction (D1) of the mounting substrate (10) in any one of the first to seventh aspects.

In the high-frequency module (100; 100a to 100g) according to a ninth aspect, the power amplifier (1, 2) includes a first power amplifier (1) and a second power amplifier (2) in any one of the first to eighth aspects. The second power amplifier (2) is a power amplifier that is of a power class higher than a power class of the first power amplifier (1). The via conductor (40) is connected to the second power amplifier (2).

According to this aspect, it is possible to improve the heat dissipation properties of the second power amplifier (2) of a relatively high power class.

In the high-frequency module (100f) according to a tenth aspect, the power amplifier (1, 2) includes the first power amplifier (1) and the second power amplifier (2) in any one of the first to ninth aspects. The first power amplifier (1) and the second power amplifier (2) are mounted on the first main surface (101) of the mounting substrate (10) in a second direction (D2) intersecting the first direction (D1), which is a thickness direction (D1) of the mounting substrate (10). The via conductor (40) includes a first via conductor (40A) and a second via conductor (40B). The first via conductor (40A) is connected to the first power amplifier (1). The second via conductor (40B) is connected to the second power amplifier (2). The first via conductor (40A) is in contact with the conductive member (106) at a portion on an opposite side from a side of the second power amplifier (2) in the second direction (D2). The second via conductor (40B) is in contact with the conductive member (106) at a portion on an opposite side from a side of the first power amplifier (1) in the second direction (D2).

According to this aspect, it is possible to improve the heat dissipation properties of both the first power amplifier (1) and the second power amplifier (2).

In the high-frequency module (100; 100a to 100g) according to an eleventh aspect, an external connection terminal (8) is further included in any one of the first to tenth aspects. The external connection terminal (8) is disposed on the second main surface (102) of the mounting substrate (10), and is connected to a signal terminal (271) of the electronic component (27). The external connection terminal (8) and the power amplifier (1) overlap each other in plan view in a thickness direction (D1) of the mounting substrate (10).

According to this aspect, it is possible to reduce an area of the mounting substrate (10) in plan view in the thickness direction (D1) of the mounting substrate (10).

A communication device (300) according to a twelfth aspect includes the high-frequency module (100; 100a to 100g) according to any one of the first to eleventh aspects, and a signal processing circuit (301). The signal processing circuit (301) is connected to the high-frequency module (100; 100a to 100g).

According to this aspect, it is possible to improve the heat dissipation properties of the power amplifier (1, 2).

1 FIRST POWER AMPLIFIER (POWER AMPLIFIER)
2 SECOND POWER AMPLIFIER (POWER AMPLIFIER)
3 FIRST SWITCH
4, 4A, 4B FIRST FILTER
5 SECOND FILTER
6 SECOND SWITCH
7 THIRD SWITCH
8 EXTERNAL CONNECTION TERMINAL
9 LOW-NOISE AMPLIFIER
10 MOUNTING SUBSTRATE
11 FIRST INPUT TERMINAL
12 FIRST OUTPUT TERMINAL
13 FIRST OUTPUT MATCHING CIRCUIT
14 SECOND OUTPUT MATCHING CIRCUIT
15, 15A, 15B FIRST MATCHING CIRCUIT
16 SECOND MATCHING CIRCUIT
17 FIRST LOW-PASS FILTER
18 SECOND LOW-PASS FILTER
19 INPUT MATCHING CIRCUIT
21 SECOND INPUT TERMINAL
22 SECOND OUTPUT TERMINAL
23 FOURTH SWITCH
24 FIFTH SWITCH
27 IC CHIP (ELECTRONIC COMPONENT)

30 COMMON TERMINAL
31 SELECTION TERMINAL
40 VIA CONDUCTOR
40A FIRST VIA CONDUCTOR
40B SECOND VIA CONDUCTOR
41 TRANSMISSION FILTER
42 RECEPTION FILTER
50 CONDUCTIVE PATTERN
51 TRANSMISSION FILTER
52 RECEPTION FILTER
60 COMMON TERMINAL
61 SELECTION TERMINAL
70A FIRST COMMON TERMINAL
70B SECOND COMMON TERMINAL
71 FIRST SELECTION TERMINAL
72 SECOND SELECTION TERMINAL
81 FIRST ANTENNA TERMINAL
82 SECOND ANTENNA TERMINAL
83 FIRST SIGNAL INPUT TERMINAL
84 SECOND SIGNAL INPUT TERMINAL
85 CONTROL TERMINAL
86 SIGNAL OUTPUT TERMINAL
87 TERMINAL
100, 100a to 100g HIGH-FREQUENCY MODULE
101 FIRST MAIN SURFACE
102 SECOND MAIN SURFACE
103 OUTER PERIPHERAL SURFACE
105 FIRST RESIN LAYER (RESIN LAYER)
106 CONDUCTIVE LAYER (CONDUCTIVE MEMBER)
107 SECOND RESIN LAYER
111 FIRST DRIVE STAGE AMPLIFICATION UNIT
112 FIRST FINAL STAGE AMPLIFICATION UNIT
151 MAIN SURFACE
153 OUTER PERIPHERAL SURFACE
163 INNER PERIPHERAL SURFACE
171 MAIN SURFACE
173 OUTER PERIPHERAL SURFACE
211 SECOND DRIVE STAGE AMPLIFICATION UNIT
212 SECOND FINAL STAGE AMPLIFICATION UNIT
230 COMMON TERMINAL
231 SELECTION TERMINAL
240 COMMON TERMINAL
241 SELECTION TERMINAL
271 SIGNAL TERMINAL
301 SIGNAL PROCESSING CIRCUIT
302 RF SIGNAL PROCESSING CIRCUIT
303 BASEBAND SIGNAL PROCESSING CIRCUIT
311 FIRST ANTENNA
312 SECOND ANTENNA
401, 402 UNIT VIA
1111, 2111 INPUT TERMINAL
1112, 2112 OUTPUT TERMINAL
1113, 2113 GROUND TERMINAL
1121, 2121 INPUT TERMINAL
1122, 2122 OUTPUT TERMINAL
1123, 2123 GROUND TERMINAL
D1 THICKNESS DIRECTION (FIRST DIRECTION)
D2 SECOND DIRECTION
Q1, Q2, Q3, Q4 AMPLIFYING TRANSISTOR

The invention claimed is:

1. A high-frequency module, comprising:
a mounting substrate having a first main surface and a second main surface opposite to each other;
at least one power amplifier mounted on the first main surface of the mounting substrate, the power amplifier including:
a drive stage amplification unit configured to amplify and output a high-frequency signal, and
a final stage amplification unit configured to amplify and output the high-frequency signal outputted from the drive stage amplification unit;
an electronic component mounted on the second main surface of the mounting substrate;
a resin layer disposed on the first main surface of the mounting substrate and covering at least a part of the power amplifier;
a conductive member covering at least a part of the resin layer and covering at least a part of an outer peripheral surface of the mounting substrate; and
a plurality of via conductors connected to the power amplifier and passing through the mounting substrate, wherein
at least one via conductor of the plurality of via conductors is in contact with the conductive member, and is connected to the final stage amplification unit.

2. The high-frequency module according to claim 1, further comprising:
a terminal disposed on the second main surface of the mounting substrate, wherein the via conductor is connected to the terminal.

3. The high-frequency module according to claim 2, wherein
the electronic component is an IC chip, and
the power amplifier and the IC chip overlap in plan view in a thickness direction of the mounting substrate.

4. The high-frequency module according to claim 2, wherein
the power amplifier includes
a drive stage amplification unit configured to amplify and output a high-frequency signal, and
a final stage amplification unit configured to amplify and output the high-frequency signal outputted from the drive stage amplification unit, and
the via conductor is connected to the final stage amplification unit.

5. The high-frequency module according to claim 2, wherein
each of the plurality of via conductors has two or more unit vias stacked in a thickness direction of the mounting substrate.

6. The high-frequency module according to claim 1, wherein
the electronic component is an IC chip, and
the power amplifier and the IC chip overlap in plan view in a thickness direction of the mounting substrate.

7. The high-frequency module according to claim 6, wherein
the IC chip includes a controller configured to control the power amplifier.

8. The high-frequency module according to claim 7, wherein
the power amplifier includes
a drive stage amplification unit configured to amplify and output a high-frequency signal, and
a final stage amplification unit configured to amplify and output the high-frequency signal outputted from the drive stage amplification unit, and
the via conductor is connected to the final stage amplification unit.

9. The high-frequency module according to claim 7, wherein
    each of the plurality of via conductors has two or more unit vias stacked in a thickness direction of the mounting substrate.

10. The high-frequency module according to claim 6, wherein
    the power amplifier includes
        a drive stage amplification unit configured to amplify and output a high-frequency signal, and
        a final stage amplification unit configured to amplify and output the high-frequency signal outputted from the drive stage amplification unit, and
    the via conductor is connected to the final stage amplification unit.

11. The high-frequency module according to claim 6, wherein
    each of the plurality of via conductors has two or more unit vias stacked in a thickness direction of the mounting substrate.

12. The high-frequency module according to claim 1, wherein
    each of the plurality of via conductors has two or more unit vias stacked in a thickness direction of the mounting substrate.

13. The high-frequency module according to claim 1, wherein
    the power amplifier includes
        a first power amplifier, and
        a second power amplifier of a power class higher than a power class of the first power amplifier, and
    the via conductor is connected to the second power amplifier.

14. The high-frequency module according to claim 1, wherein
    the power amplifier includes a first power amplifier and a second power amplifier,
    the first power amplifier and the second power amplifier are mounted on the first main surface of the mounting substrate in a second direction intersecting a first direction which is a thickness direction of the mounting substrate,
    the via conductor includes
        a first via conductor connected to the first power amplifier, and
        a second via conductor connected to the second power amplifier,
    the first via conductor is in contact with the conductive member at a portion on an opposite side from a side of the second power amplifier in the second direction, and
    the second via conductor is in contact with the conductive member at a portion on an opposite side from a side of the first power amplifier in the second direction.

15. The high-frequency module according to claim 1, further comprising:
    an external connection terminal disposed on the second main surface of the mounting substrate and connected to a signal terminal of the electronic component, wherein
    the external connection terminal and the power amplifier overlap in plan view in a thickness direction of the mounting substrate.

16. A communication device, comprising:
    the high-frequency module according to claim 1; and
    a signal processing circuit connected to the high-frequency module.

17. The high-frequency module according to claim 1, wherein
    the via conductor is further connected to the drive stage amplification unit.

18. The high-frequency module according to claim 17, wherein
    the final stage amplification unit has an input terminal, an output terminal, and a ground terminal, and
    the via conductor is connected at least to the ground terminal.

19. The high-frequency module according to claim 1, wherein
    the final stage amplification unit has an input terminal, an output terminal, and a ground terminal, and
    the via conductor is connected at least to the ground terminal.

* * * * *